(12) United States Patent
Krishnan et al.

(10) Patent No.: US 7,120,690 B1
(45) Date of Patent: Oct. 10, 2006

(54) MANAGING A DISTRIBUTED DIRECTORY DATABASE

(75) Inventors: Sriram Krishnan, Westborough, MA (US); Andreas L. Bauer, Maynard, MA (US); Gregory W. Lazar, Upton, MA (US)

(73) Assignee: EMC Corporation, Hopkinton, MA (US)

(*) Notice: Subject to any disclaimer, the term of this patent is extended or adjusted under 35 U.S.C. 154(b) by 840 days.

(21) Appl. No.: 09/965,430

(22) Filed: Sep. 27, 2001

(51) Int. Cl.
*G06F 15/173* (2006.01)

(52) U.S. Cl. .......................... 709/225; 714/4; 707/200
(58) Field of Classification Search ................ 709/223, 709/225, 239, 220; 707/200
See application file for complete search history.

(56) References Cited

U.S. PATENT DOCUMENTS

| | | | | |
|---|---|---|---|---|
| 5,664,170 A | * | 9/1997 | Taylor ......................... | 709/200 |
| 6,192,405 B1 | * | 2/2001 | Bunnell ....................... | 709/225 |
| 6,292,905 B1 | * | 9/2001 | Wallach et al. ................ | 714/4 |
| 6,460,052 B1 | * | 10/2002 | Thomas et al. ............. | 707/203 |
| 6,493,717 B1 | * | 12/2002 | Junkin ......................... | 707/102 |
| 6,516,327 B1 | * | 2/2003 | Zondervan et al. ......... | 707/200 |
| 6,816,479 B1 | * | 11/2004 | Euget et al. ................. | 370/351 |

\* cited by examiner

*Primary Examiner*—David Wiley
*Assistant Examiner*—Kyung Hye Shin
(74) *Attorney, Agent, or Firm*—Krishnendu Gupta; Joel Wall; Robert Kevin Perkins

(57) ABSTRACT

In a computer network having a plurality of computer nodes, a directory database (DDB) distributed throughout the network in each of the nodes, the contents of the DDB being maintained consistent or replicated throughout the network in a manner to avoid a single point of failure through the use of one of its nodes having been appointed as master node. The master node has a privileged status as compared to the other nodes. The master node updates each DDB in each node in its network or domain configuration when the configuration changes, such as when a node fails, a network link fails and/or a node is added or removed. A node can be added to or removed from the configuration through the master node or through a non master node. A node can fail under different circumstances in which it may or may not know which node is its master node. A master node can fail and be replaced or can be replaced for other reasons. A global administrator is a privileged user compared to other computer network users who has authority to replace or appoint a master node and to configure a domain, and who performs these and other functions by way of computer terminal screen dialogs offered by a graphical user interface (GUI) associated with the computer network. Replication service includes pinging by the master node of its failed or potentially failed nodes, and participating nodes in the configuration use repetitive polling of their master node to aid it in its pursuit of DDB consistency across the configuration.

89 Claims, 15 Drawing Sheets

ADDING A NODE

REMOVING A NODE

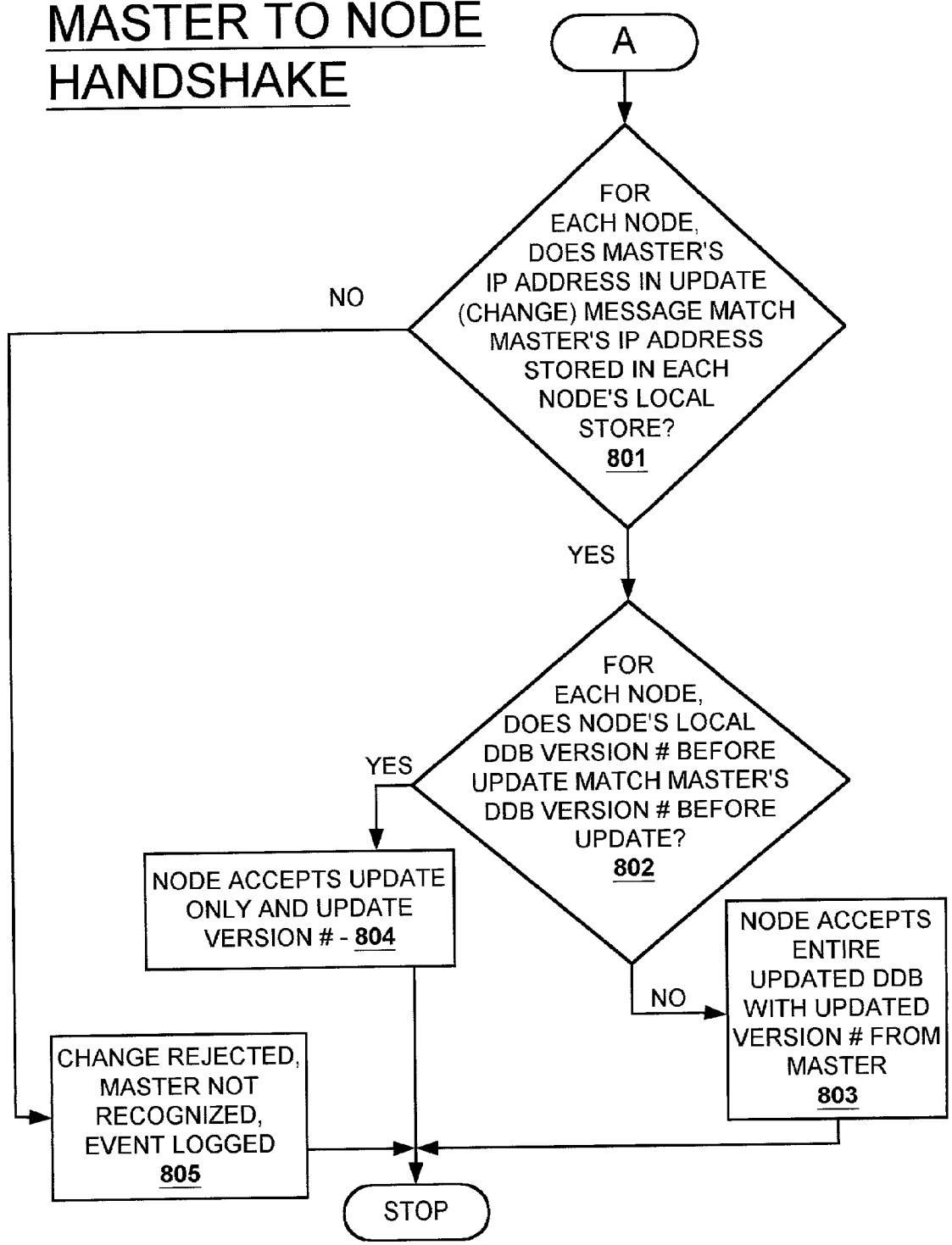

MASTER TO NODE HANDSHAKE ALTERNATIVE EMBODIMENT

NODE TO MASTER HANDSHAKE

FAILURE MODE
(FAILED NODE - MASTER UNKNOWN)

FAILURE MODE
(FAILED NODE - MASTER KNOWN)

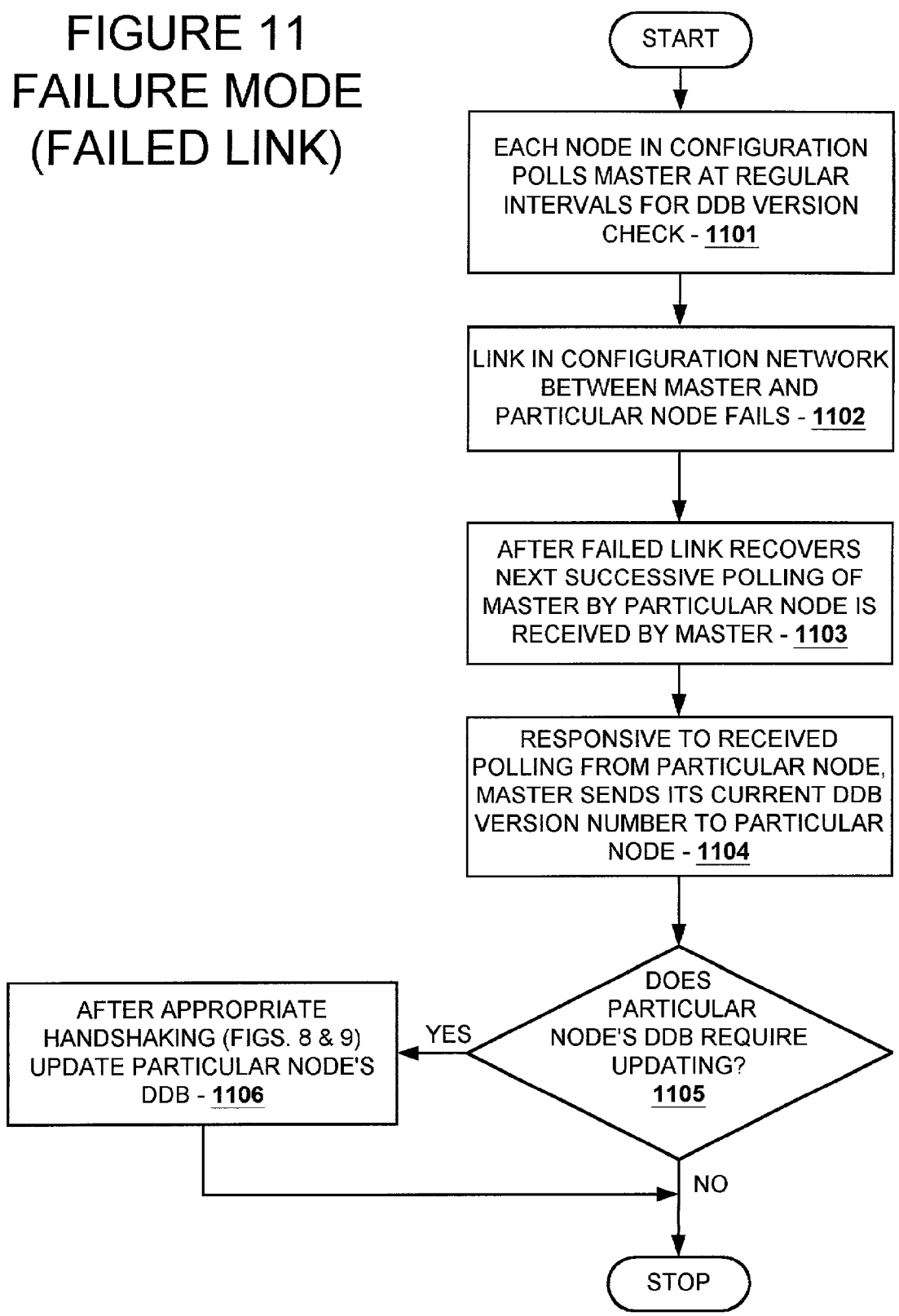

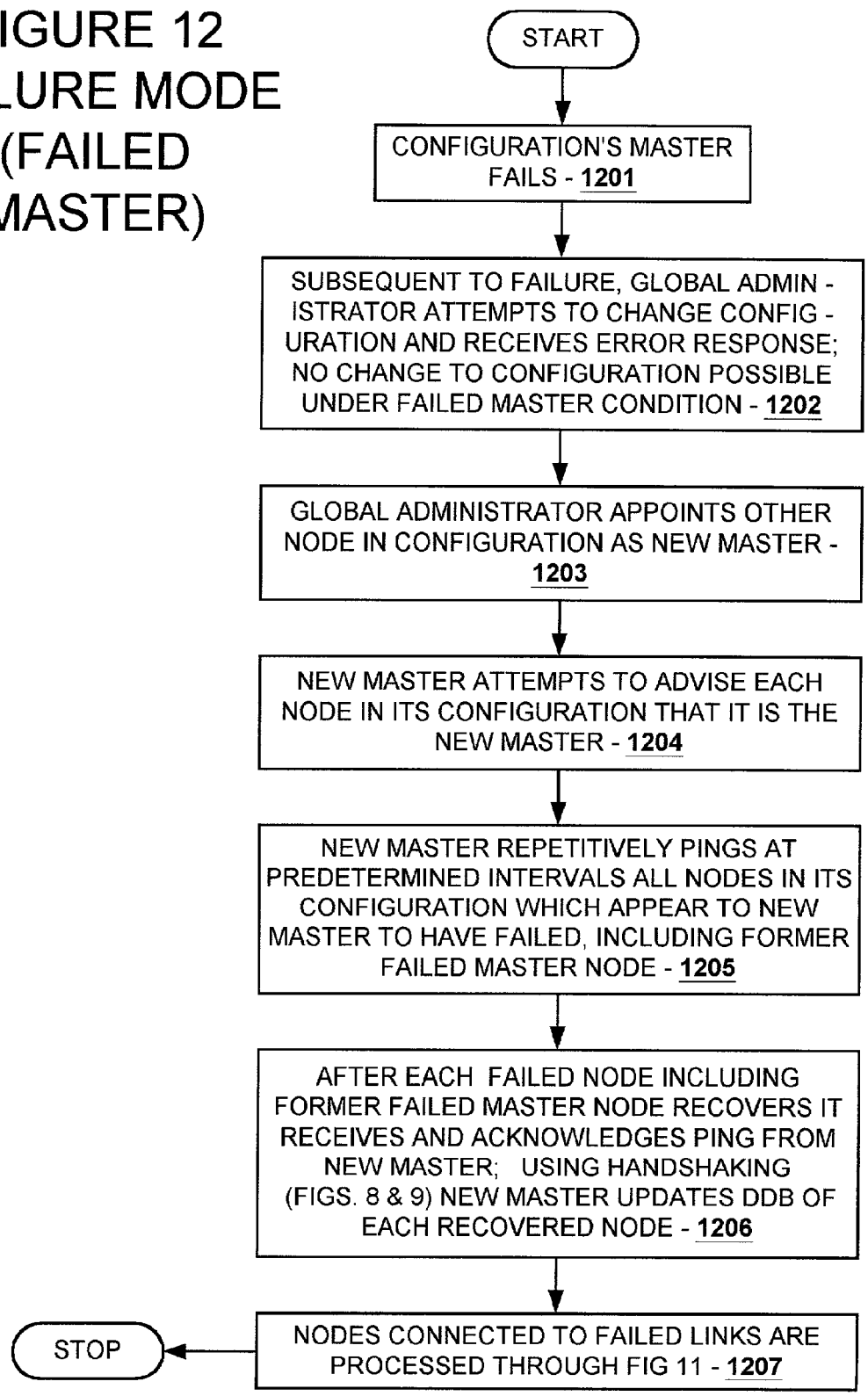

SELECT MASTER

Master Node IP Address

`128 . 221 . 34 . 187`

Master Candidate Nodes

| NODE INFORMATION | SYSTEM NAME | PROVIDER INFORMATION |
|---|---|---|
| 128. 221.42. 58 (CPC4258) | ARRAY 3 | DIRECTORY PROVIDER (VER6.0.0.1) |
| 128. 221.34.187 (CPC34187) | ARRAY 2 | DIRECTORY PROVIDER (VER6.0.0.1) |
| 128. 221.34. 63 (CPC3463) | ARRAY 1 | CLARIION PROVIDER (VER6.0.0.1) |

OK    APPLY    CANCEL    HELP

FIGURE 13

CONFIGURE DOMAIN [X]

Domain Name

DefaultDomain | Change

Scan Subnets

Subnets To Add: | Subnets To Scan:

10.14.12 | A | 128.221.34
128.221.42
10.14.12 | Scan
Stop Scan

0%------p-r-o-g-r-e-s-s b-a-r--------100% | Clear

Select Systems

IP Address of System | Selected Systems 128.221.34.16 | B

| System | Node Info |
|---|---|
| cpc4258 | 128.221.42.58 |
| cpc34187 | 128.221.34.187 |
| cpc3463 | 128.221.34.63 |

Available Systems:

| System | Node Info |
|---|---|
| Cadsys | 128.221.34.80 |
| 00-0000 | 128.221.42.64 |
| Randy | 128.221.42.80 |
| Bandy | 128.221.42.122 |
| lbb12105 | 10.14.12.105 |

C

D

Clear

OK | APPLY | CANCEL | HELP

FIGURE 14

MANAGING A DISTRIBUTED DIRECTORY DATABASE

CROSS REFERENCE TO RELATED APPLICATIONS

This patent application relates to another patent application filed on even date herewith having co-inventors Sriram Krishnan and Gregory W. Lazar, assignee in common with this patent application, the title of "Resolving Multiple Master Node Conflict in a Distributed Directory Database", and which is incorporated by reference herein in its entirety.

BACKGROUND OF THE INVENTION

1. Field of the Invention

The present invention relates to apparatus, methodology, systems, and/or computer program product for managing a directory database (DDB) and, more particularly, relates to managing a distributed DDB within a computer network environment such as a client server network.

2. Description of Prior Art

As may be observed by even the most casual computer system user, computer networks appear to be continuously evolving into ever-more sophisticated communication systems. Accordingly, computer networks are having an ever-increasing impact on modern-day lifestyle for many people, as the Internet is demonstrating. Computer networks include local area networks (LANs) such as might be encountered within a singular and localized corporate business organization where corporate functions (engineering, marketing, sales, advertising, human resources, etc.) are linked together in a localized computer network. Computer networks also include wide area networks (WANs) such as might be encountered within a corporate business organization that is nationwide or even worldwide in scope. The Internet is the premier example of a WAN, but is one that is obviously not constrained within any particular business organization and allows access to virtually any organization or individual. It is widely understood that these networks not only utilize hard-wire bus communication paths to accomplish their objectives, but can also utilize wireless telecommunication links via satellites and the like as well.

Computer network configurations usable within LANs and WANs include client-server network configurations. A client or workstation (typically having a user interface) can be networked to multiple servers which serve the client in a variety of ways. Such a client-server computer network configuration can be particularly useful in certain applications, such as in managing a computer data storage system. A client-server network can be used with the Internet. Thus, quality of operation of a storage system within a client-server network operatively coupled over the Internet not only can impact quality of performance of that client-server computer network, but can also impact quality of service received by multiple human users connected through the Internet to that client-server network. A failed or degraded storage system thus can escalate into a failed or degraded service for multiple human users.

A client-server network today may typically be based on an object oriented computer system which means that such system employs one or more object-oriented computer languages such as C++, XML (eXtensible Markup Language), JAVA, and/or others. Briefly, an object, in computer software terms, also referred to as a "node", is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in the above-noted computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, etc.). These tangible objects (nodes) in the storage system can send messages to each other within the storage system and to other objects outside the storage system over the network with which they are operatively coupled. Also, the storage system itself can be an object and interact as a node with other nodes in a network.

The relationship between and amongst these specific objects in the storage system is usually visualized or characterized as a "tree" of objects. In a tree, each such object hangs off a preceding object as if in a parent-child or inheritance relationship, with many children hanging from a parent not being an atypical configuration. In addition to these tangible kinds of objects, logical units (LUNs) are other nodes or objects that can be contained within the tree. For example, a storage system object can have several LUN objects as its children which, in turn, can have various disk objects as their children, etc. These kinds of objects are generically referred to herein as "system objects" since they all relate to a system or to components within a system, whether it is a storage system, computer system, disk drive system, or some other system, and representations of these objects can typically be displayed on a computer terminal's graphical user interface (GUI) in this tree fashion. However, in contrast, other kinds of objects (nodes) can also be formulated which do not relate to a system or its components per se, such as objects relating to user actions and represented on the GUI in other ways. (User actions are any commands or operations initiated by the user, such as, for example, creating a LUN or downloading new software to a disk, etc.). In addition, there can be yet other kinds of network nodes beyond the two types mentioned such as nodes comprising or represented by a communication tree.

Accordingly, it shall be appreciated that there can be a very large number of nodes of various kinds or "personalities" to keep track of and manage within even a relatively small and local computer network. Any one or more of these nodes can fail, for one reason or another, either temporarily or permanently, and certain other nodes can be added or removed by network users under certain conditions, and this complex and dynamic network node scenario must be efficiently and effectively managed if the computer network's intended purpose is to be fulfilled. Moreover, this network node management problem is compounded when the network is large, and possibly worldwide. The subject of these computer network nodes is discussed further in two patent applications filed by the assignee of the present invention: "Plug and Play Interface for User Actions", Desai et al, U.S. Ser. No. 09/916,102, filed Jul. 26, 2001 and "Scalable Communication Within a Distributed System Using Dynamic Communication Trees", Bauer et al, U.S. Ser. No. 09/877,862, filed Jun. 8, 2001, both of which are incorporated by reference herein in their respective entireties.

One prior art solution to the problem of managing network nodes is to elect one node to have complete information about all other network nodes in the system. Similarly, a group of nodes can be elected where each elected node in the group is assigned to its own subnet or domain of nodes and has complete information about all other nodes in its own subnet or domain. A subnet or domain is a network unto itself. All other nodes in that network, or in that subnet as the case may be, then seek information necessary to their functioning from their respective one elected node and are thus managed through that one elected node. The inherent weakness in this configuration is that if such one elected node fails, then no other node in its respective network or subnet can function resulting in a failed network or subnet. This is a single point of failure design which is not an optimum design because of at least this problem.

Prior art attempts to make this single point of failure design more reliable included use of backup nodes, to take over functioning of an elected node if and when the elected node failed. The problem with this backup design is that backup nodes can also fail and then the result is the same as before—a failed network or subnet within the network. Furthermore, when dealing with a worldwide network, which is not atypical today, if backup nodes are being relied upon because of potential elected node failures, and if all backup nodes are being maintained in one locale (e.g. United States of America) for convenience, security, or other purposes, then virtually all network node information can be destroyed for that global network if a disaster at the backup locale destroys the backup nodes. This would be a major disruption. All worldwide users (Europeans, Asians, etc.) of that worldwide network would thus lose the service provided by that network.

Thus, there is a need for an improved technique for managing nodes in a network, whether a large or small network, whether a worldwide or localized network, whether a client-server or otherwise-configured network, and embodiments of the present invention provide this improved technique—a welcome solution to these problems and shortcomings of the prior art.

SUMMARY OF THE INVENTION

Embodiments of the present invention include apparatus, method, system, and/or computer program product for managing a directory data base (DDB) distributed throughout a plurality of nodes in a computer network configuration. A DDB is a database of directory information, such as a directory of addresses of these nodes. These embodiments operate within such computer network having a plurality of such nodes. The nodes interact with computer network information. The nodes can receive, store, modify and/or transmit the information. These embodiments manage the nodes by establishing a DDB in each of the nodes and controlling contents of each DDB to be substantially identical to contents of every other DDB. In one aspect of the present invention, there is apparatus, method, system, and/or computer program product having program code that manages the nodes in a manner that establishes a DDB in each of the nodes and controls contents of each DDB to be consistent, or substantially identical to contents of every other DDB, while avoiding a single point of failure.

In another aspect of the present invention, the computer network information is computer data and domain configuration status information and each of the nodes has a unique internet protocol (IP) address. Each unique address is associated with its respective node thereby providing an IP-address-respective-node association. The association for each of the nodes is combined into a network IP association. The network IP association is distributed to the DDB in each of the nodes. The most current domain configuration status is maintained in the DDB of each of the nodes. One of the nodes is selected as a master node. All of the other nodes are subordinated to the master node in a configuration defined by the master node and all of the other nodes. A change to the domain configuration status is responded to by the master node in a manner to maintain the contents of each DDB substantially identical to the contents in every other DDB.

In yet another aspect of the present invention, in a computer network having a plurality of nodes each having a DDB, one of the nodes is the master node. The master node is used to maintain contents of the DDB in each of the nodes consistent throughout the plurality. If the master node fails, another of the nodes in the plurality is selected as the new master node. The new master node can be selected by the global administrator by invoking a select master dialog in a graphical user interface (GUI). The replacement node can be selected from the configuration. Failed and potentially failed nodes are detected and each is subjected to pinging until each one recovers. Failed nodes include the failed master node. The contents of the DDB in recovered nodes are updated to match the contents of the DDB in the new master node including the new master node's DDB version number. There is a handshaking protocol which is followed between the new master node and the recovered node when it is updated.

In still yet another aspect of the present invention, changes to domain configuration status include adding a first node to the plurality of nodes, deleting a second node from the plurality of nodes, the failing of a third node in the plurality of nodes and/or the failing of a network link between the master node and a fourth node in the plurality of nodes. The master node responds to any one or more of these changes as follows:

(a) Node Addition: The global administrator utilizes the GUI to add a node to the configuration. The adding of the first node is handled by determining if it is being added through the master node to obtain a "master-added node" or through one of the other nodes acting as a portal node to obtain a "portal-added node" (non-master-added node). Under a master-added node condition, the DDB in the master node is updated with the IP address of the first node, and the first node is informed that its master is the master node; the IP address of the master node is entered in the DDB of the first node which acknowledges the master node; and, the IP address of the first node is sent as an update to all other nodes in the configuration by the master node. By contrast, under a portal-added node condition, a cache memory in the portal node holds the IP address of the first node; a node to master handshake is performed between the portal node and the master node; the portal node informs the master node of the IP address of the first node; the master node updates its DDB with the IP address of the first node, and informs the first node that the first node's master is the master node; the first node enters in its DDB the IP address of the master node and acknowledges the master node; and, the master node sends the IP address of the first node as an update to all other nodes in the configuration. Whether or not the first node is added through the master node, a master to node handshake is undertaken between the master node on the one hand and both all of the nodes in the configuration and the first node on the other hand, as part of the update.

(b) Node Deletion: The global administrator utilizes the GUI to delete a node from the configuration. The deleting of the second node is handled by determining if it is being removed through the master node. If so: the DDB in the master node is updated by removing the IP address of the second node from the master node's DDB; the second node is informed that it is no longer included in the configuration and it is detached from the configuration; all contents of the second node's DDB is erased; and, an update is sent to all remaining nodes in the configuration. If not: a "portal-removal node" other than the master node is selected through which the second node is removed from the configuration; a cache memory is included in the portal-removal node; the IP address of the second node is stored in the cache memory; a node to master handshake is performed between the portal-removal node and the master node; the master node is informed to remove the IP address of the second node from the master node's DDB; the DDB in the master node is updated by removing the IP address of the second node from the master node's DDB; the second node is informed that it is no longer included in the configuration and it is detached from the configuration; all contents of the second node's DDB is erased; and, an update is sent to all remaining nodes in the configuration. Whether or not the second node is removed through the master node, a master to node handshake is undertaken between the master node and all remaining nodes in the configuration as part of the update sent to all remaining nodes in the configuration.

(c) Node Failure: The failing of the third node in the plurality of nodes can occur under conditions in which the master node is known to the third node, or under other conditions in which the master is unknown to the third node (third node failing while being added to configuration, and/or, master node replaced during time of failure of third node). If failing occurs under known master conditions: version numbers are established to identify versions of the DDB in each of the plurality of nodes; the master is continuously polled by all other nodes in the plurality at regular intervals to obtain the most current one of the version numbers of the DDB in the master node; after the third node recovers the master node responds to the polling received from the third node and sends the most current one of its version numbers to the third node; and, the DDB in the third node is updated if the most current one of the version numbers sent by the master node does not match the version number of the DDB in the third node. By contrast, if failing occurs under unknown master conditions: the master node repetitively pings the third node at predetermined intervals until the third node recovers and sends a recovery signal to the master node; and, the master node responds to the recovery signal and updates the DDB in the third node as may be needed. Under either condition, as part of the update, handshaking is undertaken between the master node and the third node.

(d) Link Failure: The master node handles a network link failing: version numbers are established to identify versions of the DDB in each of the plurality of nodes; the master is continuously polled by all other nodes in the plurality at regular intervals to obtain the most current one of the version numbers of the DDB in the master node; after recovery of the failed network link, the master node responds to the polling received from the fourth node over the network and sends the most current one of its version numbers to the fourth node; and, the DDB in the fourth node is updated if the most current one of the version numbers sent by the master node does not match the version number of the DDB in the fourth node; handshaking between the master node and the fourth node is undertaken as part of the updating.

In a further feature of the present invention, node to master handshaking is undertaken by an inquiring node in a plurality or configuration of nodes of its master node under certain circumstances. The address of a first node in the plurality that is presumed by the inquiring node to be the inquiring node's master is obtained. A determination is made from that first node if that first node is the inquiring node's master node. If yes, the handshaking is completed. If not, then an inquiry is made of that first node regarding who is the new master for the inquiring node. If the new master is thus determined, its address is provided to the inquiring node and the handshaking is completed. If the new master is not thus determined, then a decision is made whether or not to request the global administrator to configure information identifying the new master for the inquiring node. If such request is made of the global administrator, such information is provided to the inquiring node and the handshaking is completed. If such request is not made of the global administrator the inquiry of the first node is repeated including the repeating of any succeeding activity based on results of that repeated first node inquiry until the handshaking is concluded.

In a still further feature of the present invention, master to node handshaking is undertaken by a master node in a computer network configuration having a plurality of nodes including the master node, each of which has a DDB. Contents of the DDB include its respective DDB version number. The master node is used to maintain the contents in each of the plurality of nodes consistent throughout the plurality. The handshaking is initiated as a function of the master node undertaking to provide an update message including the master node's address to all other of the nodes in the plurality in response to a change to the network configuration. The DDB in each of the other of the plurality of nodes has an address of a purported master node. The handshaking comprises, for each node, determining if the master node address in the update message matches the address of the purported master node. If no match, the update message is rejected and the handshake is concluded. But if there is a match, then a determination is made with regard to a match between the version number of contents of the DDB in the node and the version number of contents of the DDB in the master node before the update message. If no version number match, the update message is accepted into the DDB of the node and contents of the node's DDB is replaced with contents of the master node's DDB. But if there is a version number match, only that portion of the update message is accepted into the node's DDB which is different from its contents and the handshaking is completed.

It is thus advantageous to employ embodiments of the present invention in client-server networks and any other networks where management of a distributed directory database is required. In various embodiments of the present invention summarized herein, there is no single point of failure since each DDB contains all information of every other DDB (all other DDBs). If a master node fails, the global administrator simply appoints a different node, such as another one from the configuration, to be operative as new master. If nodes or links fail the polling and pinging features keep track of these failures and become self correcting in due course, unless a failure is permanent, in which case nothing short of physical replacement of failed components can help. At least because of avoidance of a single point of failure architectural design, there cannot be catastrophic failure scenarios while using embodiments of the present invention because of failed master or other nodes, as contrasted with likely occurrence of such scenarios while using prior art node management architectures.

It is therefore a general object of the present invention to provide an improved computer network.

It is another general object of the present invention to provide improved distributed management software.

It is a further general object of the present invention to provide an improved technique for managing a distributed directory database in a computer network such as a client server network.

It is a still further general object of the present invention to provide an improved technique for managing a distributed directory database in a computer network in a manner that avoids a single point of failure design and maintains the content in the distributed directory database consistent throughout the network, regardless of node or related failures, node additions and/or node deletions.

It is an even further object of the present invention to provide an improved computer data storage system.

Other objects and advantages will be understood after referring to the detailed description of the preferred embodiments and to the appended drawings wherein:

BRIEF DESCRIPTION OF THE DRAWINGS

FIG. 8 is a flowchart reflecting an algorithm executed by operation of embodiments of the present invention in performing a master to node handshake;

FIG. 11 is a flowchart reflecting an algorithm executed by operation of embodiments of the present invention in responding to a failed network link;

FIG. 12 is a flowchart reflecting an algorithm executed by operation of embodiments of the present invention in responding to a failed master node;

FIG. 13 is a representation of a typical computer terminal screenshot associated with certain embodiments of the present invention employing a GUI, the screenshot reflecting a dialog box of the type which would enable a global administrator user to control master node selection; and, FIG. 14 is a representation of a typical computer terminal screenshot associated with certain embodiments of the present invention employing a GUI, the screenshot reflecting a dialog box of the type which would enable a global administrator user to control domain configuration or re-configuration.

DESCRIPTION OF THE PREFERRED EMBODIMENTS

Preliminarily, section headings which refer to figures to which they principally relate are used hereinbelow as an organizational aid. However, there may be discussion of subject matter reflected in a particular figure which appears in a section headed by a figure number associated principally with other subject matter. The section headings are thus not intended to be construed in a limiting manner. The terms "master node" and "master" may be used interchangeably herein and have the same meaning. And, it should be kept in mind that any network in which embodiments of the present invention are operative has an intended purpose beyond management of its nodes. For example, in a computer data storage system network, in which embodiments of the present invention are particularly useful, the main purpose of each node in such network is to enhance the overall network function of storing data, and management of its distributed DDB is only one operation involved in that overall data storage function.

Figure 1:
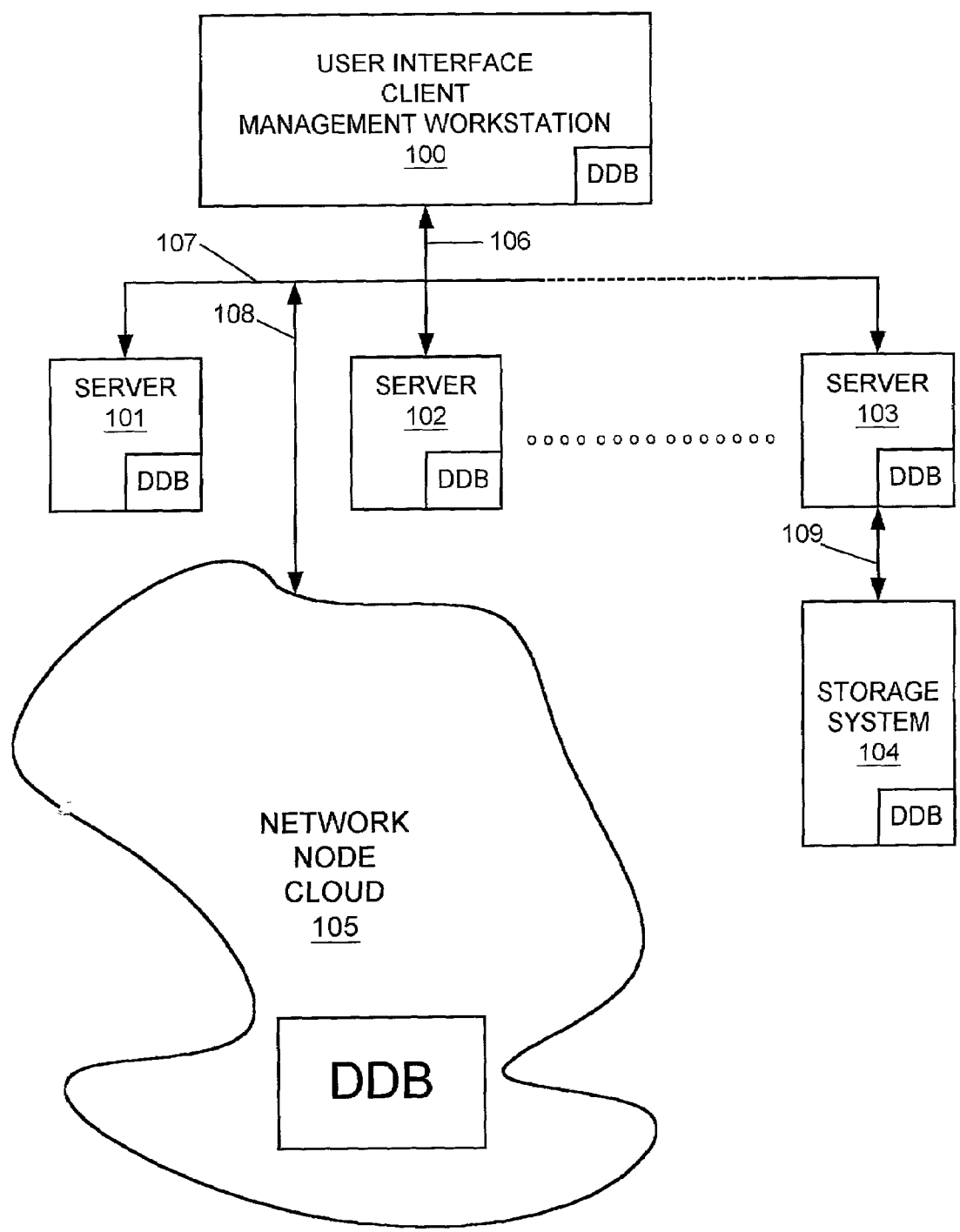
FIG. 1 is a block diagram of a client server network having multiple servers and a network node cloud in which embodiments of the present invention are particularly useful.

FIG. 1—Client-Server Network

FIG. 1 is a block diagram of an exemplary client server network having network components such as multiple servers and a network node cloud. Embodiments of the present invention are particularly useful in this network. User interface (UI) or client or management workstation 100 is connected by bidirectional bus structures 106 and 107 to servers 101, 102, and 103. UI 100 also is operatively coupled to network node cloud 105 by bidirectional bus structures 106, 107, 108. And server 103 is operatively coupled to storage system 104 by bidirectional bus 109. The network is not limited to three servers or to one storage system, and more than three servers are intended to be suggested by the broken line representing bus 107 in connection with the dots between servers 102 and 103. In a particular configuration, UI 100 can be a Windows NT or UNIX workstation that runs Navisphere 6.X user interface software or equivalents thereof; servers 101–103 can be any Windows NT machines or EMC model FC 4700 storage systems running Navisphere 6.X management servers or equivalents thereof; and, storage system 104 can be an EMC model FC 4700 storage system or its equivalent. Network node cloud 105 is intended to represent a network such as a network of EMC FC-4700 storage systems or their equivalents, containing a huge number of nodes, possibly thousands or more As shown in FIG. 1, a directory data base (DDB) is situated in each network component shown in the network. A DDB is a database of directory information reflecting identities and addresses of both the node in which it resides and the other nodes with which it communicates, much like a telephone directory book can list names, phone numbers and addresses of all telephone subscribers to a telephone network. Since each network component may include a large number of network nodes, as discussed earlier, the DDB designation shown in each component is intended to represent DDBs distributed throughout all nodes in that component. (The DDB shown in server 101, for example, represents a plurality of DDBs.) In accordance with principles of the present invention to be discussed in more detail below, under certain circumstances the DDBs in each component are maintained consistently throughout the entire network. (The entire network could be divided into independent subnets or domains, each being a sub-network, described below.) In other words, the information content in any one particular DDB in any particular node of any particular component in the network is maintained consistent (replicated, duplicated, or made substantially identical) with content of any other DDB in the network. Using the telephone book analogy, each telephone user within that calling locale (the network) should be given the same revision or version of the telephone book (the same DDB content—the same version number). Then, all such users (nodes) have current information about all other telephone users listed in their respective books. If a telephone user moves away, (node deleted) or if a new telephone user moves into the locale (node added), then the telephone book needs to be updated with the new information. The new telephone user needs to be given a complete and current telephone book (current DDB). Under these conditions all telephone users in that locale can rely on their respective telephone directories and can properly function. Similarly, if the information content in each DDB in each node in the network is maintained consistent regardless of network node changes (node additions, node deletions, node failures, master node failures, failed links, etc.), then the computer network nodes can rely on their respective database directories (DDBs) and can properly function.

Figure 2:
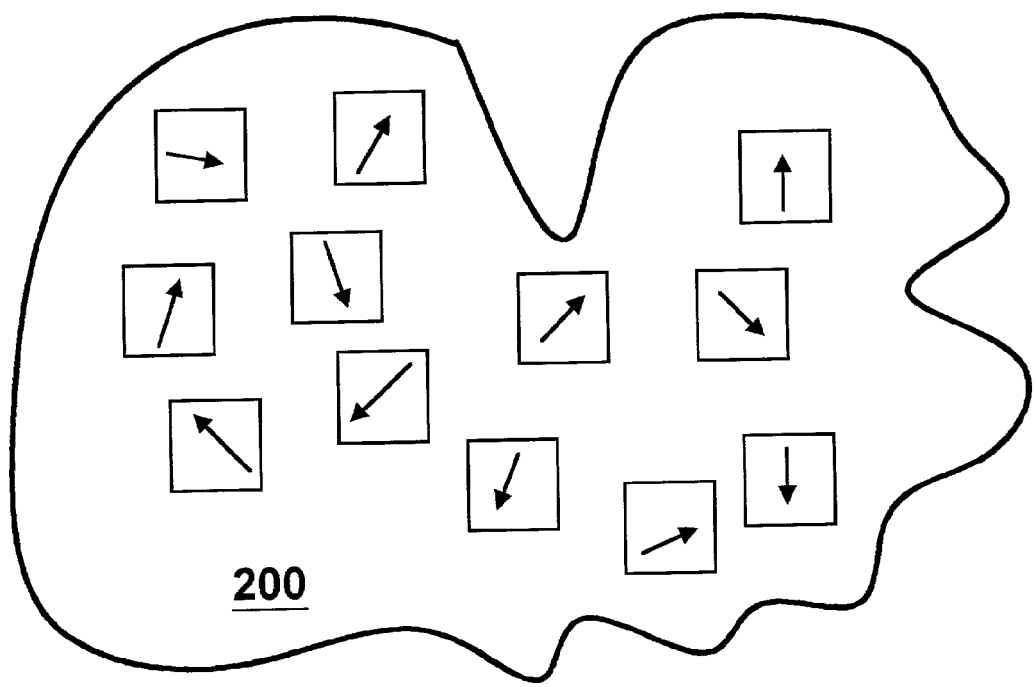
FIG. 2 is a schematic diagram showing unconfigured nodes within a defined boundary.
Figure 3:
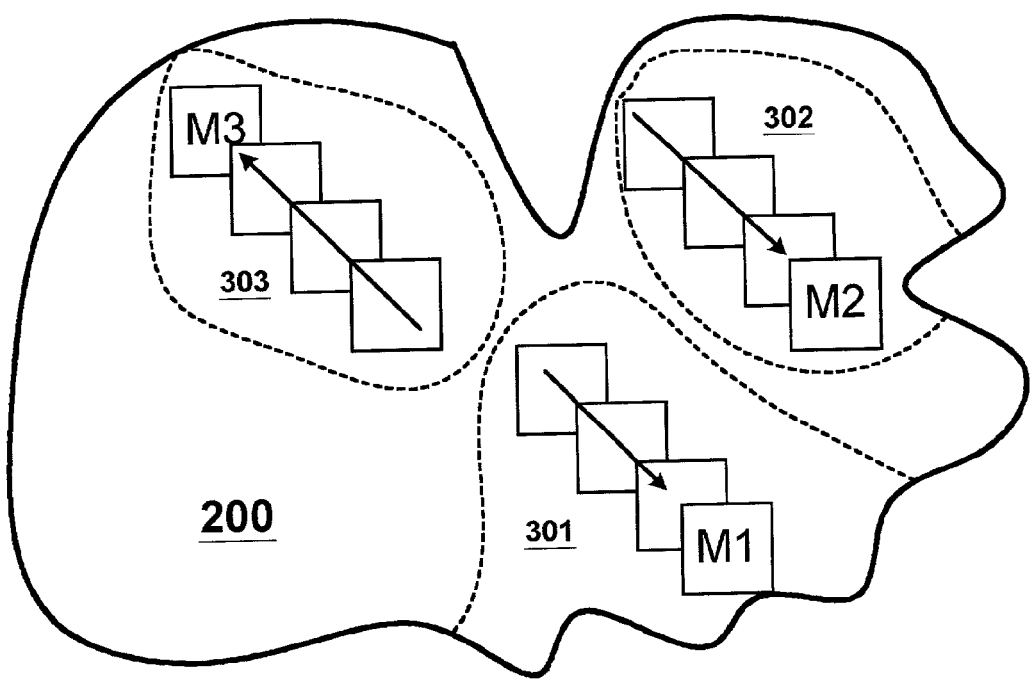
FIG. 3 is a schematic diagram showing configured nodes in three different domains within the same defined boundary.

FIGS. 2 & 3—Nodes

FIG. 2 is a schematic diagram showing unconfigured nodes within a defined boundary. Bounded space 200 may represent, for example, a portion of a computer system which has not yet been organized into an interrelated or cooperative entity, such as may exist in a recently purchased system just delivered to the purchaser and prior to such system being configured. The squares in the space represent nodes. The arrows in the squares pointing in random directions are intended to suggest that these nodes are not yet aligned with each other in a cooperative computer network effort. Each node's DDB has only its own identification information in it—its own IP address. Thus, each node in this scenario is functionally unaware of other nodes within this boundary and if it were to respond to any computer information stimuli (data and/or commands) such response would probably be independent of, uncooperative with, and/or contradictory to responses to the same stimuli received by other unaligned nodes. Bounded space 200 is not a network—yet.

FIG. 3 is a schematic diagram showing the same nodes as those in FIG. 2, but now shown as configured nodes in a network of three different domains, 301, 302, and 303 within the same defined boundary as that of FIG. 2. The same bounded space 200 thus contains the same nodes as before, but which have now been aligned, figuratively speaking, as shown by arrows, and segregated into domains within the same network boundary. (There is no literal, physical alignment or orientation of nodes into a particular geometrical direction—FIG. 3 reflects such orientation as an aid to comprehension.) Alignment, in this context, means that a particular node is subordinate to, and takes its direction from, only its master node. In accordance with principles of the present invention to be discussed in more detail below, in domain 301 nodes are aligned to node M1, in domain 302 nodes are aligned to node M2, and in domain 303 nodes are aligned to node M3. Nodes M1, M2, and M3 are termed "master nodes". The master nodes are nodes selected from the prior field of nodes within bounded space 200 and are made a little special or privileged as compared with the nodes now in alignment to them. Aligned nodes are termed "participating nodes". The responsibility of a master node is to ensure that contents of DDBs of all participating nodes in its configuration (all nodes in domain 301 including master M1 are in the configuration of master M1, etc.) are maintained consistent or substantially identical. The master node's job is to replicate or duplicate the information content stored in its own DDB into each DDB in each participating node in its configuration. As noted, after each such DDB is replicated as desired it can be conceptualized as being "aligned" to its master node, as exemplified by the arrows superimposed on the nodes in domains 301, 302, and 303 pointing, respectively, in alignment to master nodes or masters M1, M2, and M3.

These master nodes are selected by a computer network user termed a "global administrator", a user who is privileged as compared with other users in that computer network. Only the global administrator has proper authorization to select or change master nodes, and make other network changes. Other users have rights limited to merely using the network, as is. The global administrator selects nodes M1, M2, and M3 through a network user interface, e.g. UI 100 of FIG. 1, based on factors relevant and important to the administrator. For example, selection of master nodes could be based on proximate locations of such nodes to those intended to be in their respective configurations. Another example would be selection of a master node based on its functional relevance to the intended function of its configuration. The internet protocol (IP) addresses of the nodes to be selected as master nodes are known to the global administrator by way of the GUI, about which more shall be discussed hereinbelow.

Figures 4A, 4B:
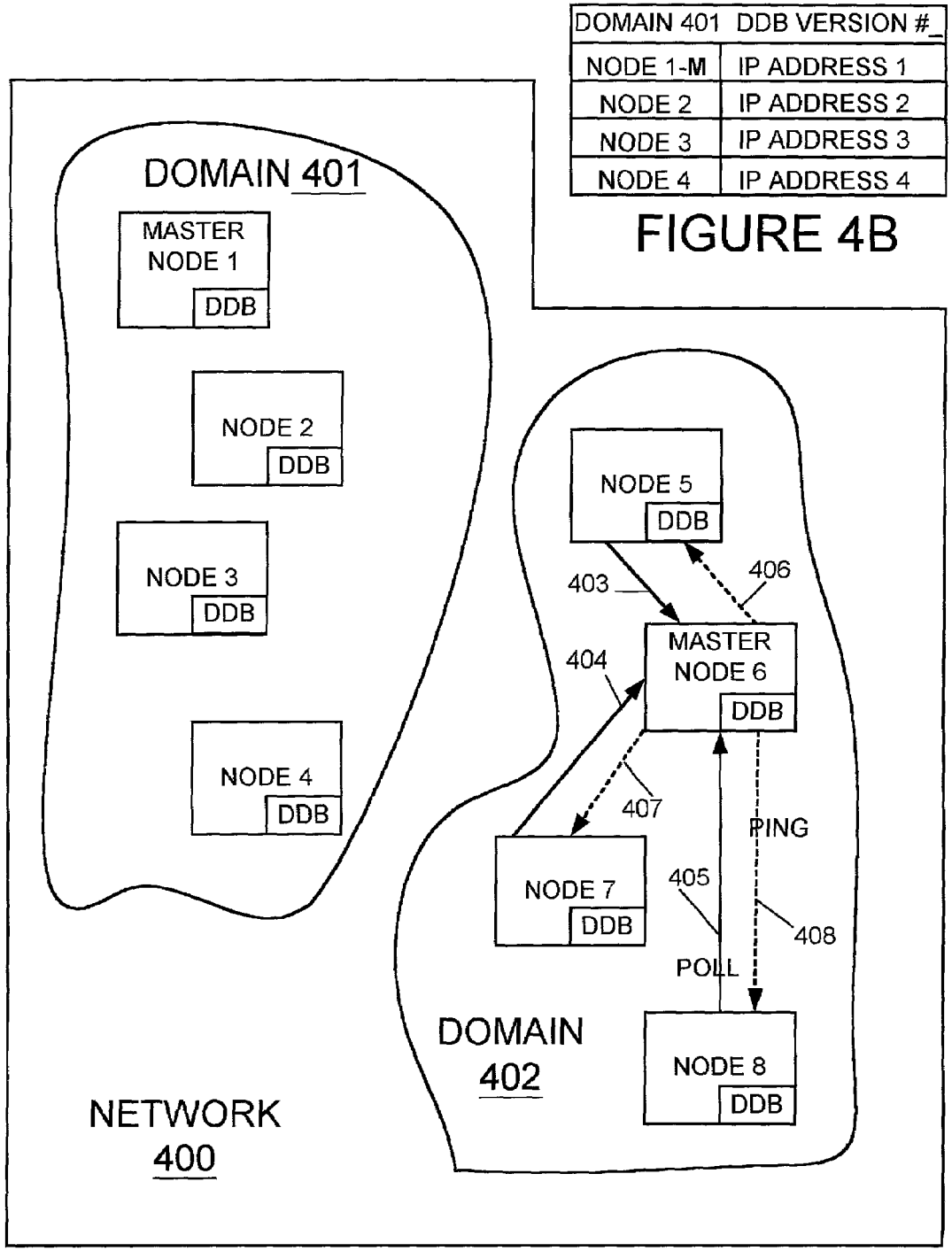
FIG. 4A is a schematic diagram of a network containing two domains of network nodes having a master node in each domain.
FIG. 4B is a schematic diagram of the directory database distributed throughout one domain in the network of FIG. 4A.

FIGS. 4A/B—Network & Domains—Overview

FIG. 4A is a schematic diagram of an exemplary network containing two domains of network nodes having a master node in each domain. This diagram shall be used in an overview discussion involving creation of a configuration, and shall use the example of adding nodes to the configuration as an introduction to certain concepts of the present invention. More detail about these concepts as well as other necessary actions of removing nodes and handling various failure scenarios shall be presented hereinbelow in connection with other Figures.

Assume that network 400 initially was not configured as shown, but that it was merely a boundary which contained nodes 1–8 inclusive in an unconfigured state, such as reflected in FIG. 2. The first action undertaken is for the global administrator to pick a node as master, and, in this example, node 1 is picked. Node 1 is selected by way of a GUI (not shown in this Fig.) through a "select master" dialog box which appears on a terminal screen of the GUI and which reflects IP addresses of nodes in this boundary. At this point, the master node represents a configuration of one node—no other node in the otherwise unconfigured boundary is aware that node 1 has been made master node. Then, assume that the global administrator adds nodes 2 and 3 to the configuration, in that order, by sequentially selecting such nodes' respective IP addresses from a "configure domain" dialog box on the terminal screen of the GUI, by placing the terminal screen cursor and clicking the mouse on "buttons" appearing in this dialog box which cause these nodes to be sequentially added to the configuration. More about this procedure will be presented in connection with FIGS. 13 and 14 hereinbelow. At this point, however, status of all nodes is: DDBs in nodes 1, 2, and 3 each have the same contents, namely: IP addresses of nodes 1, 2, 3, and a flag that node 1 is master, and nodes 4–8 remain unconfigured for the time being. Domain 401 has thus far developed into a three-node configuration. The unconfigured nodes are further discussed hereinbelow.

Backtracking momentarily, when the global administrator is adding node 2 to the configuration, such node is necessarily being added through, or by way of, the only node that pre-existed node 2 in the domain 401 configuration, namely node 1. Accordingly, node 1, acting as master node, forwards information to just-arrived node 2 which advises node 2 that node 1 is going to be master for node 2 and that node 2 has been added to the configuration of node 1. Node 2 is thus a "master-added node". Node 2 then checks the version number of the DDB in information received from the master node. A version number is a unique worldwide number (WWN), a number that if once used is never used again. In this example of a new configuration being created out of a boundary of chaotic or unaligned nodes the version number of the master node's DDB could be zero. If the version number in information sent by the master node is different from the pre-existing version number of the DDB in node 2 (the likely case), then node 2 needs to get a copy of the entire contents of the master's current DDB and to update (replace) the DDB in node 2 to be identical to the DDB in node 1. But, if version numbers of the DDBs in nodes 1 and 2 are the same (not likely), then the foregoing update/replacement is avoided. The same basic procedure is undertaken for node 3 and for any other node to be added to the domain 401 configuration, but there is some significant variation to the procedure as a function of which node in the configuration is selected by the global administrator to be a "portal node"—the node through which a new node is to be added. If the portal node is master node, then the above procedure is used, but if the portal node is a configured node within domain 401 other than master node then a different procedure is used, as follows.

If the global administrator adds node 3 through node 2 thus making node 2 a portal node for new node 3, node 2 stores the IP address of node 3 in a cache memory within node 2 (not within the DDB of node 2), sends a message to master node 1 that node 3 has been or is being added and provides the IP address of node 3 in that message. If master node 1 successfully receives this message from node 2, master node 1 immediately updates itself by adding node 3 IP address information to its DDB and changes its version number. The version number changes from one unique WWN to a different unique WWN. Concurrently, node 1 sends a "success note" back to portal node 2 about which more will be said below. Further, master node 1 sends a message to node 3 that the master for node 3 is node 1 and also provides node 3 with the changed new version number of node 1 as well as a copy of the contents of its entire DDB. Newly arrived node 3 accepts such contents, updates its DDB therewith, applies the changed new version number to such contents, and is thereafter a participating node along with node 2 in a configuration designated as domain 401 in which node 1 is master node.

Although, node 2 has retained the IP address of newly-added node 3 in its cache memory, node 2 has not yet been updated. The earlier-mentioned success note contains at least the master node's prior version number as well as its changed new version number. Node 2 compares the master node's prior version number received in the success note against its own version number of its DDB. On the one hand, if these version numbers match, portal node 2 updates its own DDB with node 3 IP address information which is being stored in the node 2 cache memory, thereby relieving the master node from unnecessarily returning node 3 IP address information back to node 2. Portal node 2 also updates its version number to be the same as the changed new version number of the master node which was received in the success note. But, on the other hand, if the prior version number of master node 1 did not match the version number of portal node 2, then portal node 2 destroys contents in its cache memory about new node 3 and waits for its update message from master node 1. (The update message is a change notification to all participating nodes in the master node's domain and is part of the master node's replication process.) If there were many other operative and participating nodes in domain 401, they would all be subjected to this replication process and portal node 2 would be just one of all such participating nodes being updated with information about newly added node 3 at the time of the update message. A significant aspect of this procedure is that portal node 2 receives minimal communication from master node 1 to achieve update of its DDB as noted above. Accordingly, any master node is worked minimally and network or configuration "housekeeping" traffic is kept minimal in the present invention while maintaining contents of distributed DDBs consistent throughout any given node configuration.

Next, consider node 4, another new node being added to the configuration of domain 401. If the global administrator, by way of the computer network's GUI, selects node 3 as portal node for node 4, and if node 3 cannot properly communicate with master node 1 for one of a number of reasons such as the network link between master and node 3 (not shown in FIG. 4A) has failed, then node 4 cannot be added to the configuration through node 3. In such an event, an error message is sent to the GUI so that the global administrator knows to select another node as portal node for node 4. The global administrator can again select node 2 as portal node, this time for node 4, and node 4 can thereby be successfully added to the domain 401 configuration in a manner similar to the adding of node 3. (Another reason why node 4 might not be able to be added to the configuration is that the master node itself has failed in which case an error message is again returned to the global administrator as before, but which additionally advises of failure of a master node. In this case the configuration is frozen and cannot be changed until a new master is created by the global administrator, and discussion of this event is presented hereinbelow.)

Domain 402 is shown with nodes 5, 6, 7 and 8. These nodes are shown in a configuration with node 6 as its master node. These four nodes in this configuration have been created in the same manner as those in domain 401, but either by a different global administrator from the one in control of domain 401, or by the same global administrator intending to establish a different and mutually-isolated domain from domain 401. Accordingly, these two domains represent two different configurations which can co-exist in a single computer network without either domain interfering with the other. More than two domains can co-exist in a single network and only two are shown as an example. (Related subjects are further discussed hereinbelow in connection with the section on "Marriage of Two Subnets"). Nodes in this domain are shown to be interconnected by communication lines 403–408 inclusive in a particular manner, about which more shall be said hereinbelow in connection with master node "pinging" and participating node "polling" techniques.

In FIG. 4B, the DDB which is distributed throughout the configuration of domain 401 is depicted in schematic format. Content of this DDB reflects successful addition of node 4 to the domain 401 configuration and is the same content for each DDB within each of nodes 1–4. This DDB associates each of the nodes in the configuration with its respective IP address. These nodes could thus be localized, as in a LAN, or could be far-flung and located around the globe being connected through the Internet. Node 1 has a flag associated with it, shown in the diagram as an "M" to designate node 1 as the configuration's master. Since each node in the domain 401 configuration has these contents in its DDB, each node knows that node 1 is its master, because each DDB contains this "M" flag next to or associated with the node 1 address content in its database. And each node in the configuration also knows the IP address of every other node (all other nodes) in the configuration. The DDB contains domain identification information, as reflected by "DOMAIN 401" shown in the Figure. And, the DDB also contains a version number as shown, "DDB VERSION #_" to reflect or identify the status or version of its content, namely, participating node information as currently stored in its DDB. In the case of master node 1, as noted above, it has the capacity to forward to participating nodes in its configuration not only its prior DDB version number which was stored in its DDB, but also can forward its changed update version number as stored in its updated DDB, in the event of a network configuration status change. A schematic drawing for the DDB distributed throughout the configuration of domain 402 would be similar to the DDB for domain 401, but would have different content reflecting different IP addresses and version number.

The procedure of adding a new node to a configuration, whether a master or non-master node in the configuration is used as portal node, requires certain handshaking protocols. These shall be discussed in detail hereinbelow in connection with flowcharts depicting their respective algorithms. Furthermore, as noted earlier, this discussion of FIG. 4 has considered only the example of adding a new node in connection with a high level overview of certain aspects of the present invention. Other changes to a configuration including node deletion, node failure, master node failure, and master to node link failure are considered in detail hereinbelow.

Figure 5:
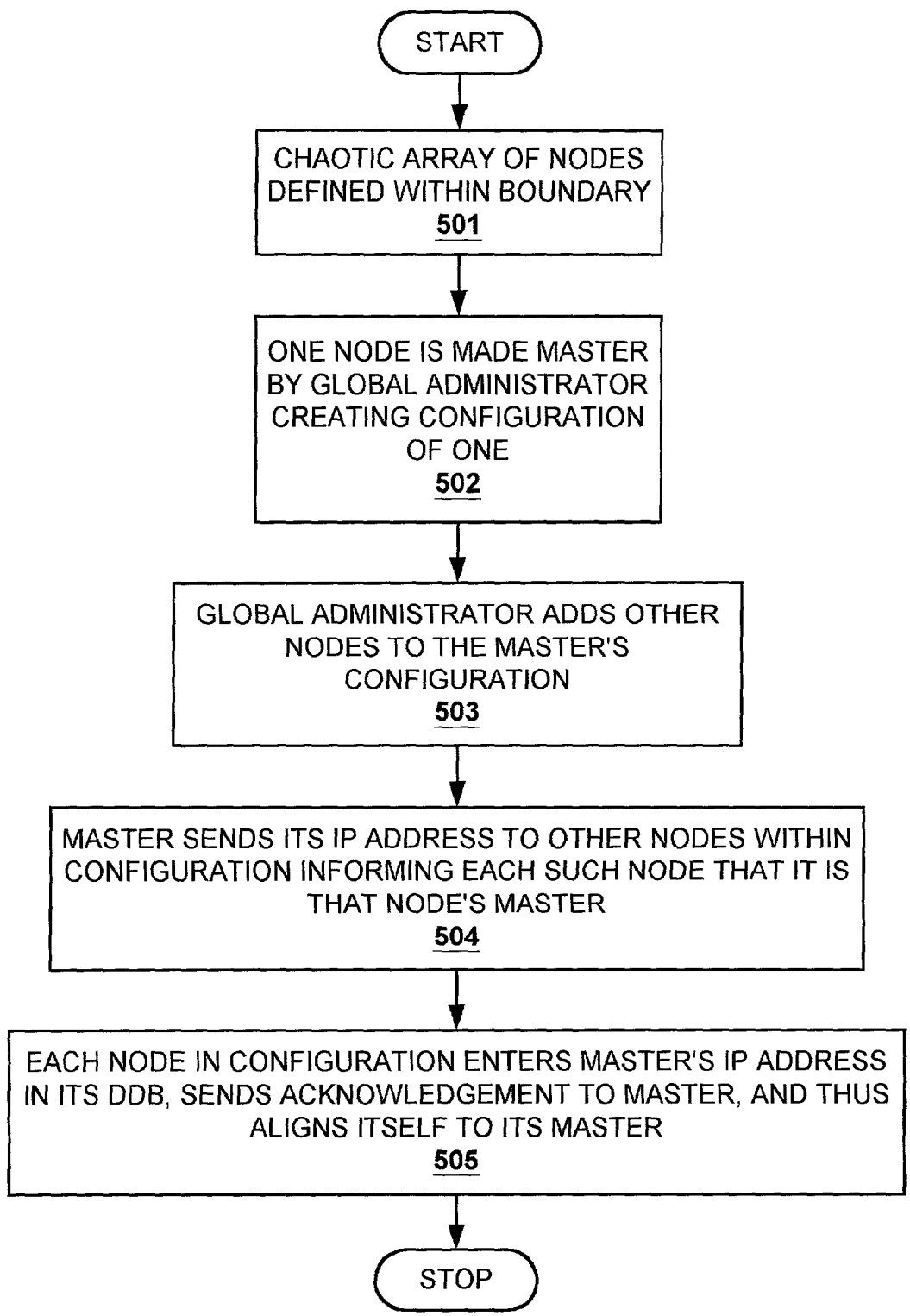
FIG. 5 is a flowchart reflecting an algorithm executed by operation of embodiments of the present invention in establishing a configuration.

FIG. 5—Establishing Configuration

FIG. 5 is a flowchart reflecting an algorithm executed by operation of embodiments of the present invention in establishing a configuration or domain. Initially, in block 501 a chaotic array of nodes are defined within a boundary, such as those nodes shown in FIG. 2. The algorithmic process moves to block 502 wherein a node is made master node by the global administrator through operation of the create master dialog box in the GUI, thereby creating a configuration of one node. In this case, one of the nodes within the boundary can be selected to be the master node. (A node outside of the boundary could have been chosen by the global administrator to be the master node.) Software, employed in preferred embodiments of the present invention, by which the master is chosen and by which all other objectives of the present invention are accomplished, is C++ object oriented software. Such software is the best mode now known by which to implement the present invention, although other object oriented software such as Java could have been chosen.

The algorithmic process then moves to block 503 where the global administrator chooses other nodes through the GUI from either within or outside of the boundary to be added to the configuration. Next, in block 504, the master node sends its IP address to all the other nodes chosen to be within the configuration informing each of them that the master node is their master. (Employing personification, in such "informing" the master is effectively saying: "I am the master for you"!) This informing is also referred to herein as the aforementioned pinging, which is also used to deal with certain failure scenarios, and will be discussed in more detail in connection with FIGS. 10A and 12. In block 505 each chosen node enters the master node's IP address in its DDB, acknowledges the master node, and thus aligns itself to the master node. This acknowledgment is vital for the master to receive from each node in its configuration so that the master knows that each such node is properly aligned. Failure to receive an acknowledgment from a particular node alerts the master that such node might have failed and sets up a repetitive pinging activity. The actions in blocks 503, 504, and 505 are accomplished by way of the configure domain dialog box in the GUI. The steps or actions in this Figure are repeated as many times as are necessary to accomplish the total number of domains desired per network. Thus, in FIG. 3, within network boundary 200, three subnets or domains are formed by these steps being undertaken three times by either one or multiple global administrators.

FIG. 6—Adding Node

Figure 6:
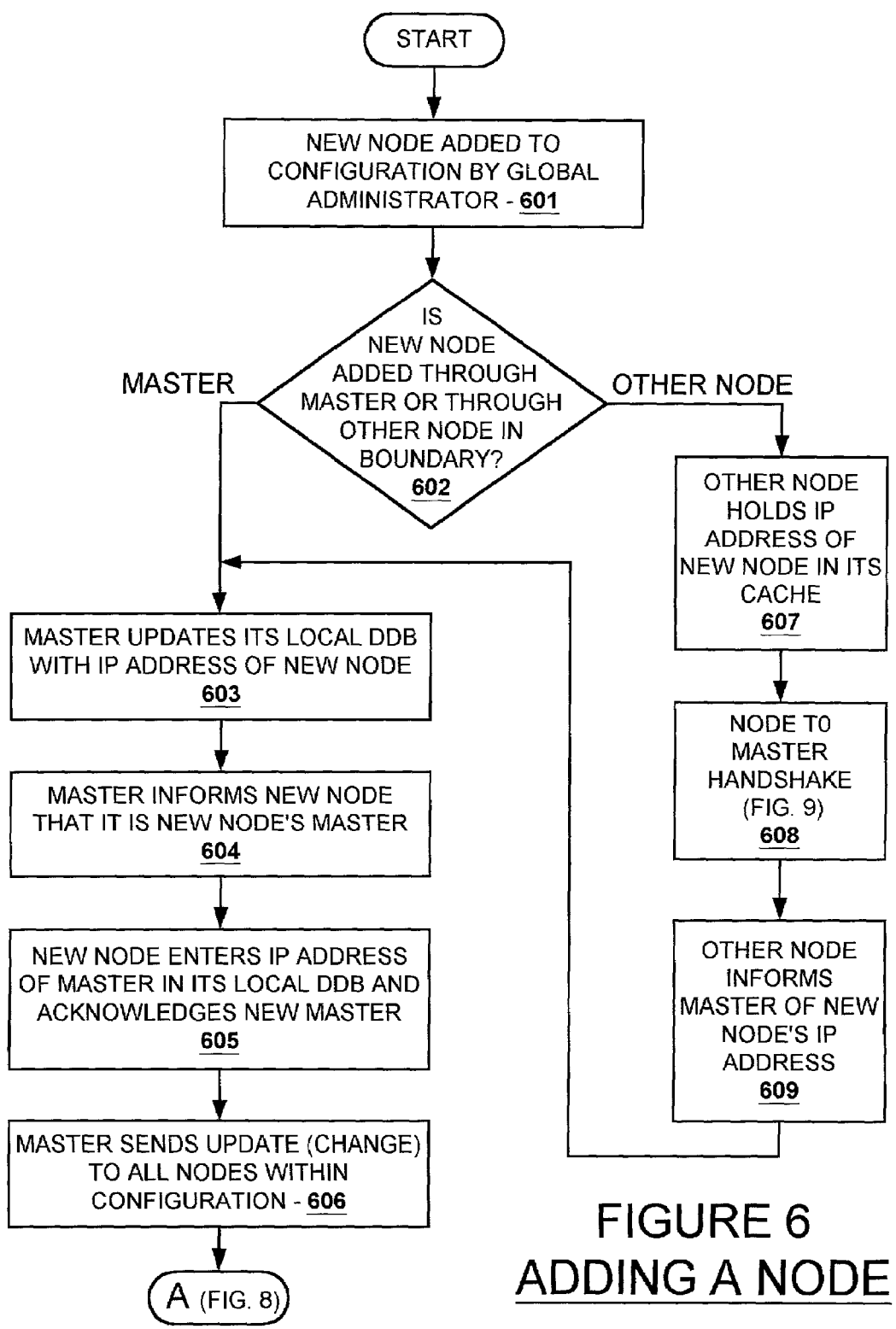
FIG. 6 is a flowchart reflecting an algorithm executed by operation of embodiments of the present invention in adding a node to a configuration.

FIG. 6 is a flowchart reflecting an algorithm executed by operation of embodiments of the present invention in adding a node to a configuration or domain. Discussion about adding a node was presented in connection with FIGS. 4A/4B above, and is applicable here. Initially, in block 601, the global administrator decides to add a new node to an existing configuration of nodes (either a subnet or an entire network), and selects the new node by way of IP addresses shown in the configure domain dialog box in the GUI (to be described in connection with FIGS. 13 and 14). In block 602, the global administrator chooses between adding the new node into the configuration by way of the existing master node or by way of another node (a portal node) existing within the configuration.

On the one hand, if the master node is chosen, then the algorithmic process moves to the group of blocks 603–606. In block 603, the master node immediately updates its own DDB with the new node's IP address since the new node is being processed through the master node and the new node's IP address is available. Then, in block 604, the master node informs the new node that it is the new node's master. Next, in block 605, the new node enters the master node's IP address in its DDB and acknowledges its new master. Thereafter, in block 606, the master sends an update notice to all nodes within its configuration to advise them of the addition of the new node by providing the new node's IP address for inclusion in their DDBs. The algorithmic process moves to FIG. 8 wherein a master to node handshake is undertaken between the master node and each node in the configuration as well as between the master node and the new node. In that handshake, to be discussed in detail in connection with FIG. 8, contents of each node's DDB is verified as being up-to-date or is otherwise is brought up-to-date resulting in consistent or identical contents of all DDBs in the network.

On the other hand, if another node is chosen as a portal node by or through which to add the new node, the algorithmic process moves from decision block 602 to block 607. In block 607 the other (portal) node holds the IP address of the new node in a cache memory located in the portal node. Next, in block 608, a node to master handshake is undertaken by the portal node with its master node to verify that such master node is, in fact, the portal node's current master node. This handshake is undertaken in FIG. 9 and shall be discussed in detail in connection with that figure. Thereafter, in block 609, the portal node informs the master node of the new node's IP address. At this point, the master node has the same information about the new node as it had earlier in the discussion, when the decision made in block 602 was to choose the master node to function as portal node. Thus, the algorithmic process now moves to that same point, namely to block 603, and the above-described process for blocks 603 through 606 including the master to node handshake of FIG. 8 are repeated.

Figure 7:
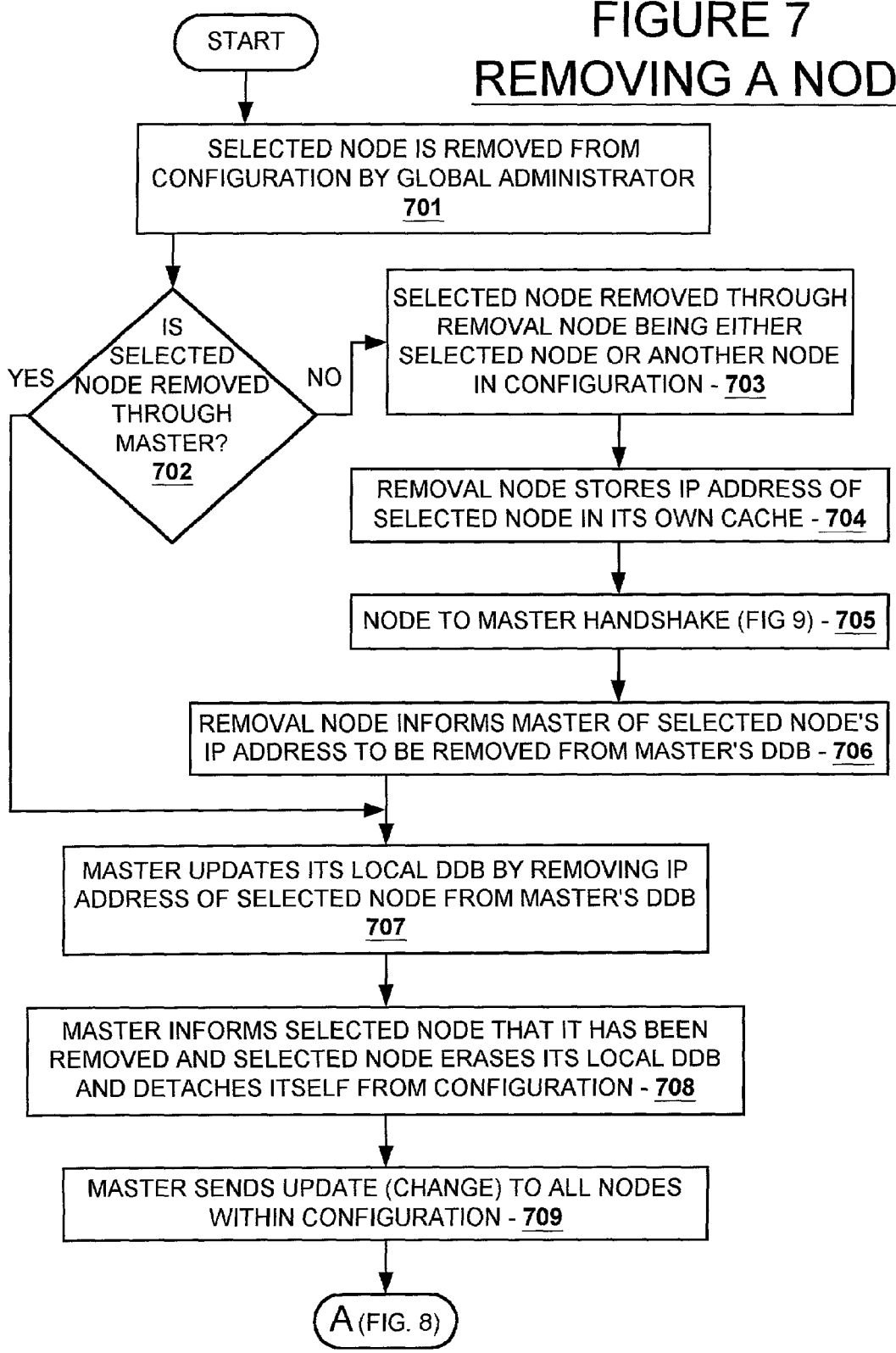
FIG. 7 is a flowchart reflecting an algorithm executed by operation of embodiments of the present invention in removing a node from a configuration.

FIG. 7—Removing Node

FIG. 7 is a flowchart depicting an algorithm executed by operation of embodiments of the present invention in removing a node from a configuration or domain. Initially, the global administrator selects a node to be removed in block 701 by again referring to the IP address information of all nodes in the configuration as shown in the configure domain dialog box in the GUI (to be described in connection with FIGS. 13 and 14). The global administrator makes a decision to remove the selected node through either the master node or through another node in the configuration—a portal-removal node.

On the one hand, if the global administrator decides to remove the selected node through the master, the process moves to block 707 where the master node updates its own DDB by removing the IP address of the selected node from its DDB. Then, in block 708, the master node informs the selected node that it has been removed from the configuration and the selected node erases or destroys its own DDB and thereby detaches itself from the configuration. Thereafter, in block 709, the master node sends an update message to all nodes remaining within the configuration, and as part of that update the master-to-node handshake depicted in FIG. 8 is performed.

On the other hand, if the global administrator decides to remove the selected node through a portal-removal node, the process moves to block 703 wherein the selected node can be removed either through itself as portal-removal node or through another node in the configuration as portal-removal node. This choice is made by the global administrator, but in either case the same process is followed. In block 704, the chosen portal-removal node stores in its own cache memory the IP address of the selected node. In block 705 a node to master handshake is performed as depicted in FIG. 9 to ensure that the master node, as reflected by its IP address stored in the portal-removal node's DDB, is the actual, current master node of the configuration. (FIG. 9 is discussed in detail hereinbelow.) Thereafter, in block 706, the portal-removal node informs the master node of the selected node's IP address to be removed from the master node's DDB. At this point, the master node has the same information about the selected node as it had earlier in the discussion, when the decision made in block 702 was to choose the master node to function as portal-removal node. Thus, the algorithmic process now moves to that same point, namely to block 707, and the above-described process for blocks 707 through 709 including the master to node handshake of FIG. 8 are repeated. In that handshake, to be discussed in detail in connection with FIG. 8, contents of each node's DDB is verified as being up-to-date or is otherwise is brought up-to-date resulting in consistent or identical contents of all DDBs in the network.

Figure 8A:
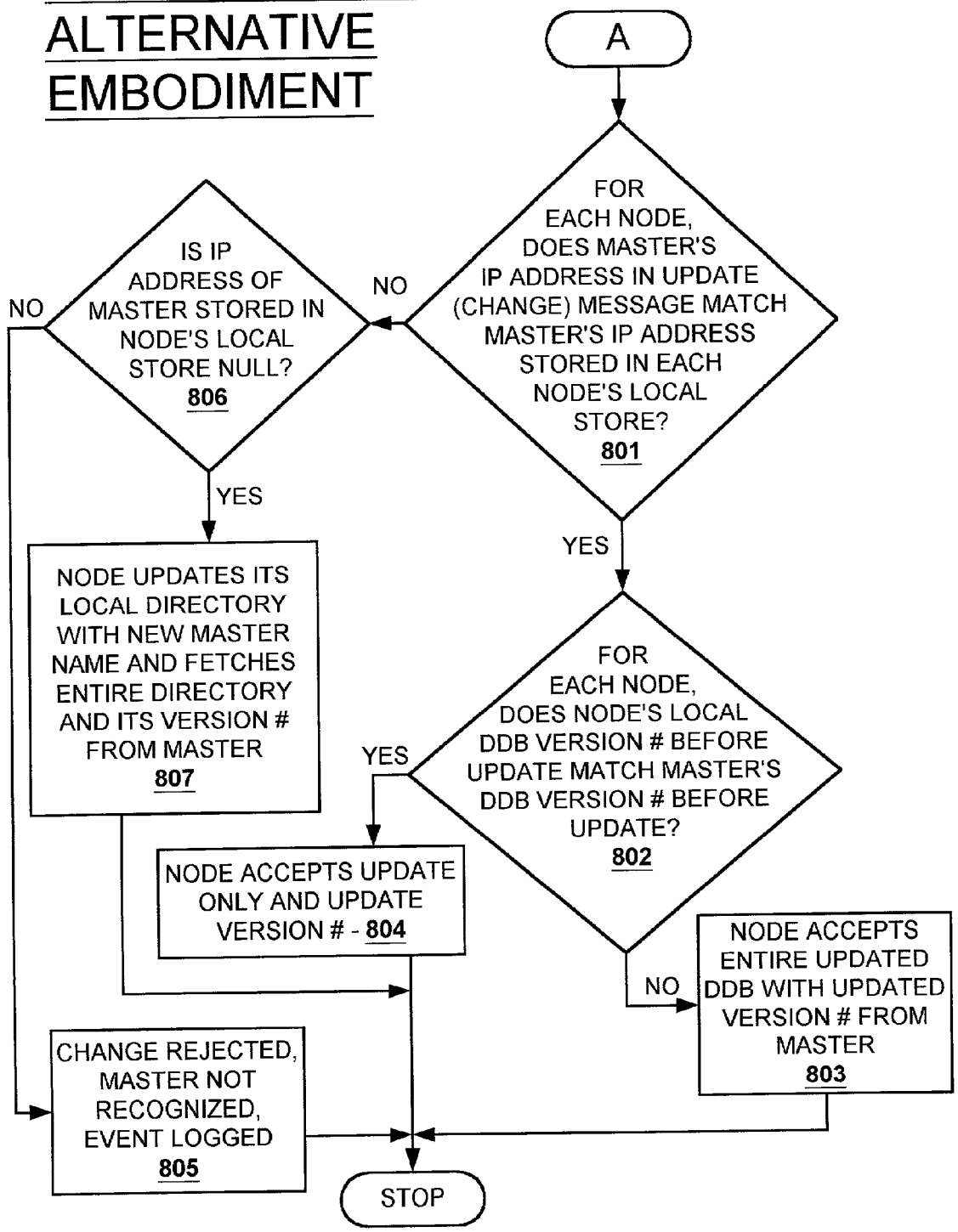
FIG. 8A is a flowchart reflecting an algorithm executed by operation of alternative embodiments of the present invention in performing a master to node handshake.
Figure 9:
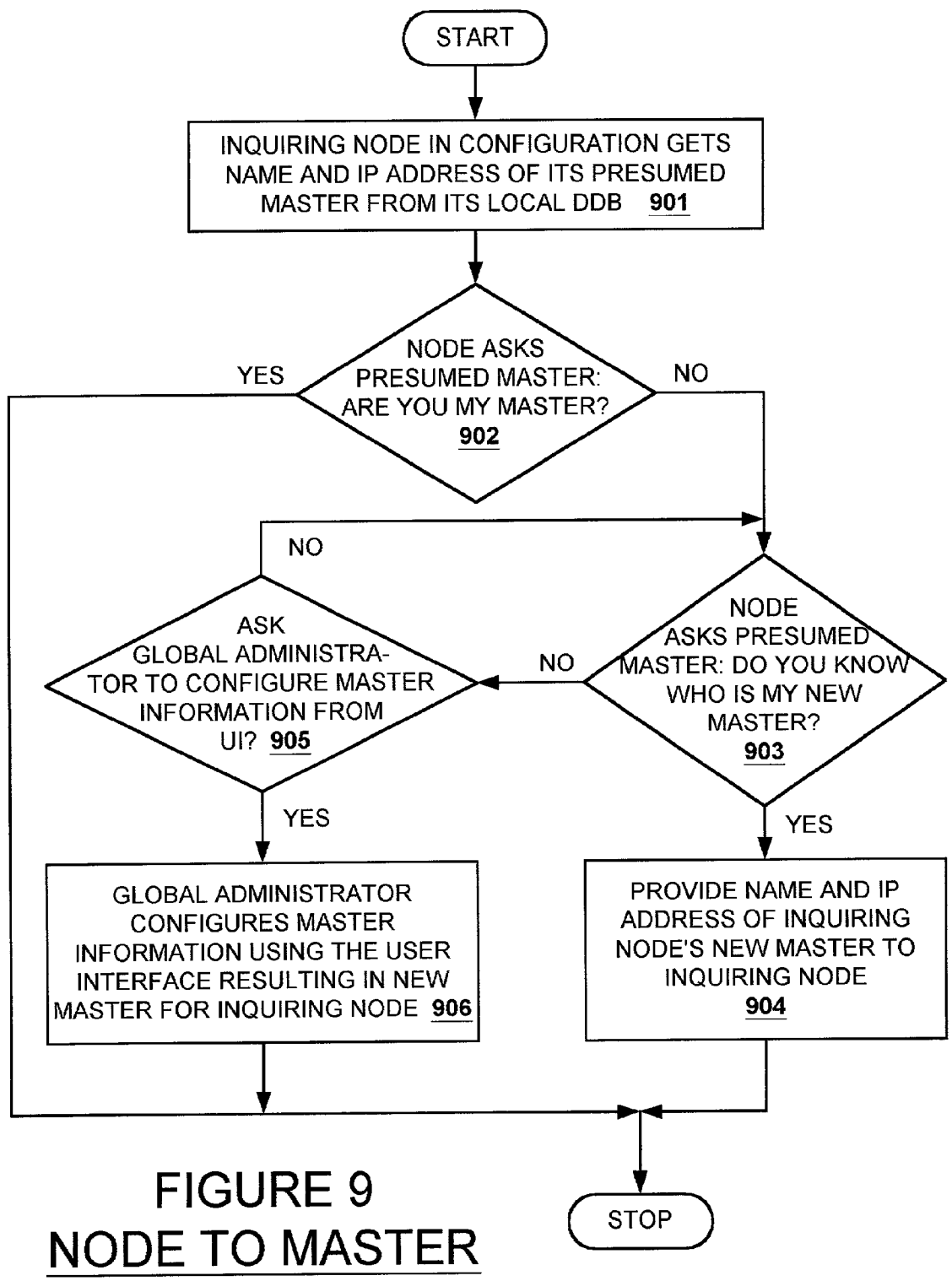
FIG. 9 is a flowchart reflecting an algorithm executed by operation of embodiments of the present invention in performing a node to master handshake.

FIGS. 8 and 8A—Master to Node Handshake

FIG. 8 is a flowchart depicting an algorithm executed by operation of embodiments of the present invention in performing a master to node handshake. For situations wherein a master node has need to send substantive information to its participating nodes, this handshake is used with each such participating node prior to the master sending that information to that participating node. For example, substantive information such as the "configuration update" performed in the last step in the algorithmic process from either FIG. 6 (adding a node, block 606) or FIG. 7 (removing a node, block 709) is subjected to this handshake by being input to tab "A" in FIG. 8.

In query block 801, for each node in the configuration, a decision or determination is made regarding whether or not the master node's IP address in the configuration update (for either a node added or node removed update) matches the purported master node's IP address stored in each node's DDB, as verification of the master's identity. Verification is important because participating nodes in a configuration must receive commands and updates from only their one true master node. Without verification a problem could arise. For example, if a master node fails, requiring the global administrator to appoint a different node as new master node (discussed in detail in connection with FIG. 12), the new master node sends out notification to all nodes in its configuration that it is their new master node. All participating nodes in the configuration realign themselves to the new master node without problem. But, if the failed master node recovers after appointment of the new master node, and if a user or different global administrator erroneously logs-in to that previously failed master, there is a chance that it might be erroneously used as master in the same configuration, which has to be prevented. The verification operation defined by query block 801 prevents this problem from occurring. (In addition to and concurrently with this handshake, there are pinging and polling activities between master node and all participating nodes in the configuration that overlays this handshake. These activities are described in connection with FIGS. 10A/B, 11, and 12 and deal with situations of failed nodes, failed links, as well as failed masters.)

Returning to operation of block 801, if there is an IP address mismatch whereby the answer is "no" for any particular participating node in the configuration, then in block 805 the change or configuration update is not recognized by that particular node, the event is not logged into the DDB of that particular node, and the handshake is concluded. In effect, this means that the particular node sends a message back to the master node advising it that it is not the particular node's master (in such case the likelihood is that the particular node is participating in a different domain under a different master). Thereupon, the master node removes the IP address of that particular node from the master node's DDB and sends the change to all other nodes in the configuration. However, if the answer is "yes", the process then moves to query block 802 where version numbers are compared. For each participating node in the configuration, its DDB version number before the configuration update is compared with the master node's DDB version number before the update. This step ensures that each participating node's DDB contents were the same as the master node's DDB contents before the update.

On the one hand, if the version numbers are the same whereby the answer to the query in block 802 is "yes" then in block 804 only the update information (only the IP address of the node being added or the node being removed) is accepted into that participating node's DDB, and the handshake concludes. On the other hand, if the answer is "no" then the version numbers do not match which means that contents of their respective DDBs do not match. There is no readily available technique to determine to what extent any such DDB may be out-of-date. Accordingly, for the situation of a version number mismatch, the participating node flushes its contents and accepts the entire contents of the master node's DDB including both updated configuration information about the added or removed node and a changed new master node version number. Thereafter, the handshake concludes.

Referring next to FIG. 8A, a flowchart is depicted of an algorithm executed by alternative embodiments of the present invention in performing a master to node handshake. The flowchart is the same as that in FIG. 8 except for the addition of two blocks, 806 and 807. If there is a mismatch between a master node's IP address as reflected in an update message from that master node and another master node's IP address as stored in the DDB of any participating node in the configuration, then the algorithmic process moves to query block 806. In query block 806 a determination is made regarding whether or not the other master node's IP address stored in that participating node's DDB is null (invalid). On the one hand, if "no", not null (meaning valid), then such address is in conflict with the master node IP address in the update message, whereby the update/change is not recognized or accepted as reflected in block 805, and the handshake is concluded. On the other hand, if "yes", meaning that such address is null, then that nulled or invalidated address had earlier been made ineffective and cannot possibly be in conflict with the master node IP address in the update message. But the nulled address does indicate that such participating node's DDB contents may be out-of-date. Accordingly, in block 807 such participating node flushes the contents of its DDB, and updates its DDB with the new master name and a copy of all contents stored in the master node's DDB, including both the update message and master node DDB version number. Thereafter the handshake concludes.

FIG. 9—Node to Master Handshake

FIG. 9 is a flowchart depicting an algorithm executed by operation of embodiments of the present invention in performing a node to master handshake. For situations wherein participating nodes in a configuration have need to send substantive information to their master node, this handshake is used for each such node prior to its sending that information. For example, this handshake is used when adding a node to a configuration through a participating portal-added node (see block 608 in FIG. 6) and when removing a node from a configuration through a participating portal-removal node (see block 705 in FIG. 7).

In block 901, an inquiring node having need to send substantive information to its master gets the name and address of its presumed master stored in its own, local, DDB. In decision block 902 that node inquires of the presumed master if it is that node's master. If the presumed master node responds "yes", the handshake is concluded. But, if the presumed master node responds "no", then the algorithmic process moves to another decision block, block 903.

In block 903 the inquiring node inquires if the presumed master knows who is the new master. If the answer is "yes", where the presumed master knows the identity of the new master, the algorithmic process moves to block 904 wherein the presumed master provides the name and IP address of the new master to the inquiring node after which the handshake is concluded. But, if the answer is "no" the algorithmic process moves to yet another decision block, block 905.

In block 905, which is needed when the presumed master does not know who is the new master, a decision needs to be made about asking the global administrator to configure a new master node by use of the select master dialog box in the GUI (discussed in connection with FIG. 13). If the answer to the query in block 905 is "no", the inquiring node inquires again in block 903 if the presumed master knows who is the new master—it is possible that the presumed master may have learned of the new master's identity. For example, the presumed master may have been a master that failed and was earlier replaced with a new master by the global administrator. If the presumed (failed) master was not brought up-to-date by the time of occurrence of the first inquiry by the inquiring node, but is brought up-to-date at a later time whereby identity of the new master is then made known to the presumed master, then inquiry of the presumed master (in block 903) after that later time will result in provision of the new master's identity. This iterative loop or iteration means thus operates until either block 904 is utilized as described above, or until the decision in block 905 is "yes"—to ask the global administrator to configure a new master node by way of the GUI. If "yes", the algorithmic process moves to block 906 wherein the global administrator configures new master node information using the GUI which results in a new master for the inquiring node and the handshake is concluded.

Figure 10A:
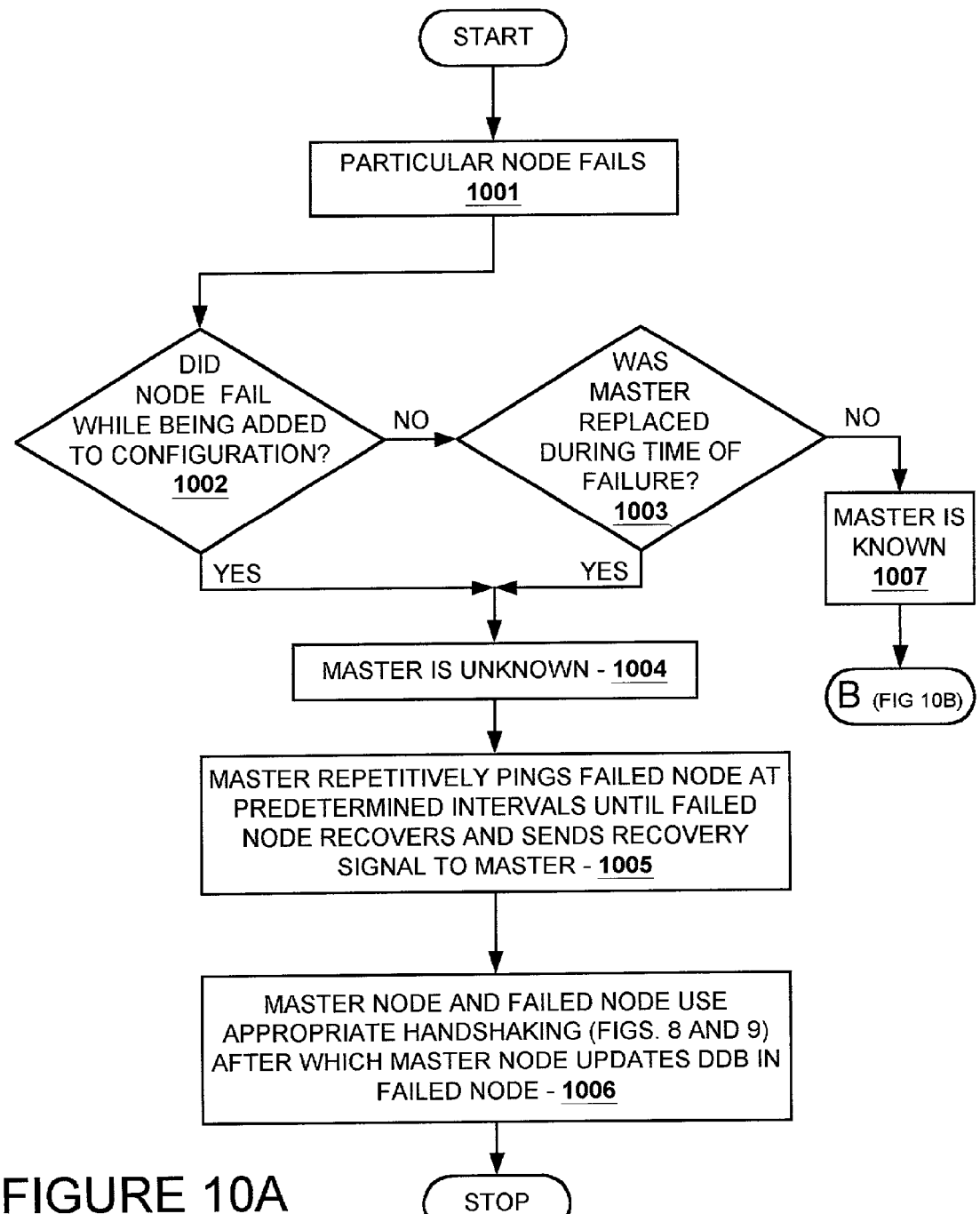
FIG. 10A is a flowchart reflecting an algorithm executed by operation of embodiments of the present invention in responding to a failed network node that does not know which node is its master node.

FIG. 10A—Failed Node—Master Unknown

FIG. 10A is a flowchart depicting an algorithm executed by operation of embodiments of the present invention in responding to a failed node that does not know which node is its master node. This situation can arise in a first scenario where the node failure occurred while the node was in the process of being added to a configuration. In this scenario the DDB in the node being added had not been updated with any master node DDB information including the IP address of the master—thus the master is unknown to this failed node. This situation can also arise in a second scenario where the master node—for the configuration in which the failed node had been a participating node—was replaced while the failed node was inoperative. In this second scenario the DDB in the failed node had also not been updated with any (new) master node DDB information including the new IP address of the new master node—thus the new master is unknown to this failed node.

However, the failed node is known to the master node in either scenario. In the first scenario, the master has the IP address of the node being added because it was being added either through the master itself which directly provides the master with the node's IP address, or through a portal-added node which forwarded the IP address of the node being added to the master in the normal course of operation, earlier discussed. In the second scenario the new master has the IP address of the failed node because the new master inherits, or gets a copy of, content of the DDB of the replaced master, including IP addresses of all participating nodes including the IP address of the failed node. In the first scenario, the master sends the personified pinging message noted in connection with FIG. 5: "I am the master for you" to the new node being added unaware that it has failed and awaits the expected acknowledgment from that node. In the second scenario, the master sends that message to all nodes in the configuration unaware that any have failed and awaits the expected acknowledgment from each of its participating nodes. If the expected acknowledgment is not received by the master from the node being added in the first scenario or from any particular participating node in the second scenario, it shall continue—at regular intervals—to ping that node from which such acknowledgment was expected.

Referring-back to FIG. 4A momentarily, repetitive pinging messages 406, 407, and 408 are shown emanating from master node 6 and directed to nodes 5, 7, and 8 respectively. Since master node 6 will not repetitively ping an operative node, repetitive pinging of nodes 5, 7, and 8 would occur only if each node failed while being added to the network or if each node was in a failed state when master node 6 became the new master for nodes 5, 7, and 8. If, in fact, these three nodes failed while being added to the configuration, with failure times that overlap each other, pinging of each node would occur but not simultaneously with pinging either of the other nodes, since the nodes were not being added simultaneously. On the other hand, if these three nodes had been in failure at the time when node six was made their master, then the pinging of the three nodes would occur substantially simultaneously, because master node 6 would discover each of their failed conditions substantially simultaneously. In either case, in the best mode now known for practicing the present invention, pinging intervals are approximately five minutes. At the end of each of the intervals a single ping or a ping burst can occur. A non-response alerts the master or the new master node to the fact that the failed node has not recovered. These failure scenarios are handled by the algorithmic process depicted in FIG. 10A and described as follows.

In FIG. 10A, a particular node fails in block 1001. In decision block 1002 the question is asked: did the node fail while being added to the configuration? If "no" the algorithmic process moves to block 1003 where the question is asked: was the master node replaced during time of failure? If "no" the master is thus known to the failed node, as is reflected in block 1007, and the instant algorithmic process is not applicable. The algorithmic process moves away to tab "B" of FIG. 10B which deals with a different circumstance—node failure when the master node is known to the failed node.

Returning to both query blocks 1002 and 1003, if the answer to the questions posed in either or both these blocks is "yes", the master node is unknown to the failed node as shown in block 1004. The algorithmic process moves then to block 1005, where the master node repetitively pings the failed node at predetermined intervals until the failed node recovers and sends a recovery signal to the master. As noted above, one of such messages, or alternatively bursts of such messages, can be sent at the end of each of those intervals.

The recovery signal is the first of the "polling" signals to be received by the master from the failed node after it recovers, and polling shall be discussed in connection with FIGS. 10B and 11 herein. The algorithmic process moves next to block 1006 in which the master node and the failed node use appropriate handshaking as depicted in FIGS. 8 and 9, discussed above, during which the master node updates the failed node's DDB and this algorithmic process concludes.

Figure 10B:
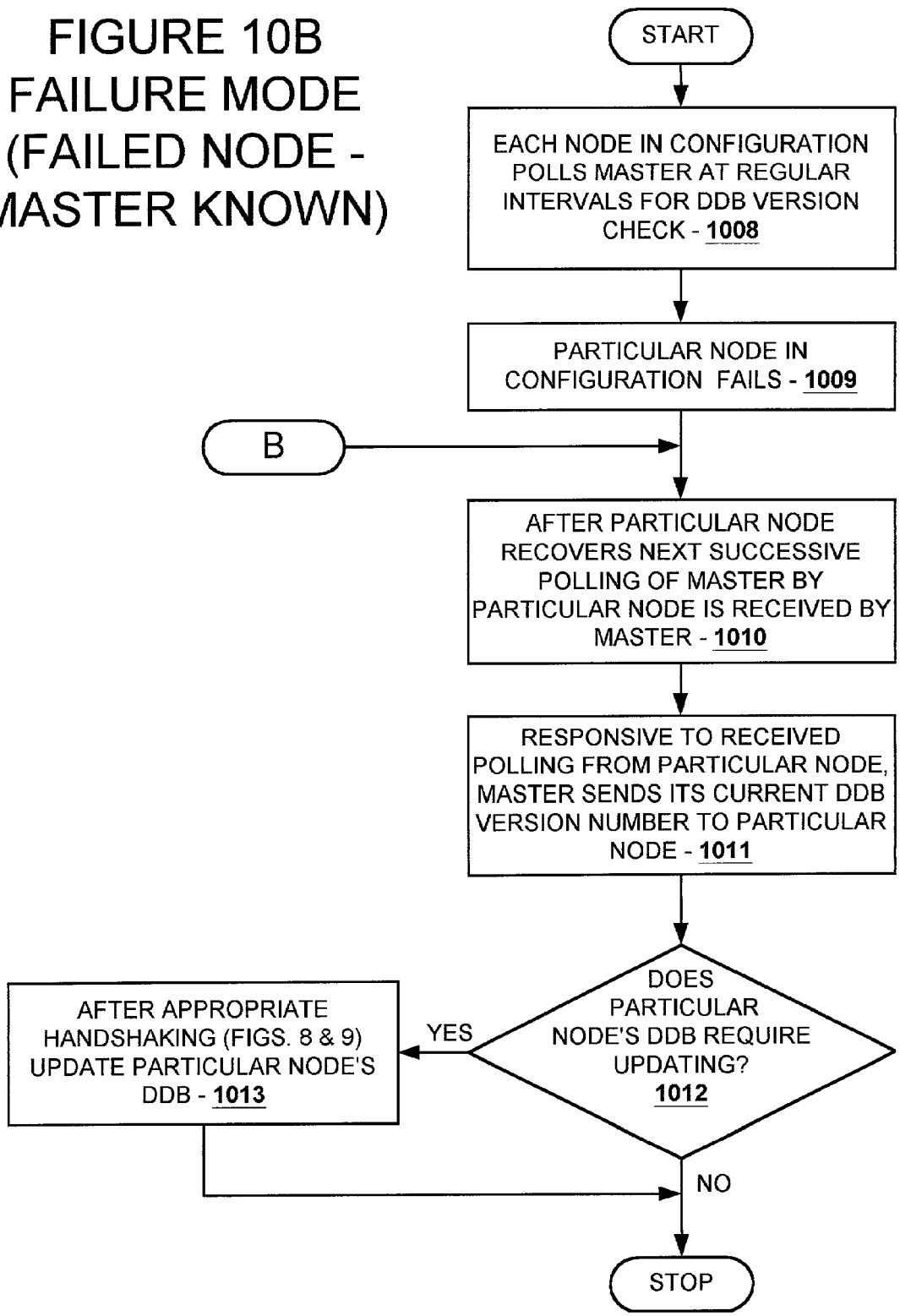
FIG. 10B is a flowchart reflecting an algorithm executed by operation of embodiments of the present invention in responding to a failed network node that does know which node is its master node.

FIG. 10B—Failed Node—Master Known

FIG. 10B is a flowchart depicting an algorithm executed by operation of embodiments of the present invention in responding to a failed node that does know which node is its master node. In block 1008 each node in the configuration polls its master at regular intervals for a DDB version check. Each node thus regularly requests of its master a return message including the master's current DDB version number so that the node can compare it against its version number. If the version numbers match, then the node is reassured that its DDB's contents match the master's DDB contents. In the best mode now known for practicing embodiments of the present invention, the regular interval between polling inquiries is approximately ten minutes for each node.

Referring-back once more to FIG. 4A, nodes 5, 7, and 8 are shown polling master node 6 by way of polling inquiries 403, 404, and 405 respectively. These polling inquiries are not designed to occur simultaneously but must be made at the predetermined interval. Thus, in a large network under normal operating conditions the master node might receive such polling inquiries virtually continuously from its various participating nodes. Polling at the predetermined interval by each node in a configuration of its master is a continuous operation, to be contrasted with pinging by the master of nodes only under certain conditions including certain failure scenarios which is not a continuous operation, as discussed above. It should be understood that polling inquiries 403, 404 and 405 would be successful communications to master node 6 only if nodes 5, 7, and 8 were in fact operative and if their respective links to their master were also operative. Although both repetitive pinging messages and continuous polling inquiries are both shown together in FIG. 4A, it should be understood that in the earlier example where nodes 5, 7, and 8 had failed and repetitive pinging messages occur there could be no polling inquiries at that time—the drawing shows both sets of communications in the interest of thorough explanation.

Returning to FIG. 10B, the algorithmic process moves to block 1009 wherein a particular node in the configuration fails. This failed node did not fail while being added to the configuration nor was its master replaced during the time of its failure, but it failed under other circumstances. This state in the algorithmic process is the same as that reflected in block 1007 in FIG. 10A which is therefore connected at tab "B" along with the flowchart output of block 1009 into block 1010. In block 1010, after the particular node recovers, its next successive polling inquiry of the master is received by the master. In block 1011 responsive to the received recovery signal which is the first polling message after node recovery, the master sends its current DDB version number to the now-recovered particular node. In decision block 1012 the query is posed: does the particular node's DDB require updating? On the one hand, if the answer is "no", the algorithmic process is concluded. Updating is not necessary if the master's current DDB version number matches the version number of the particular node. This indicates that the DDB contents were not changed in the master node's DDB during the time of failure of the particular node. On the other hand, if the answer is "yes", the version numbers do not match reflecting a change to the contents of the master node's DDB, and the algorithmic process moves to block 1013. In block 1013 appropriate handshaking as depicted in FIGS. 8 and 9 are undertaken, after which, or as part of which, the particular node's DDB is updated to match that of the master node and the algorithmic process is concluded.

FIG. 11—Failed Network Link

FIG. 11 is a flowchart depicting an algorithm executed by operation of embodiments of the present invention in responding to a failed network link between a particular participating node in the configuration and its master node. For example, in FIG. 1, storage system 104 can contain a plurality of subnets or domains (not shown) each with its own master, and any link could fail between any node and its master in any of those subnets within such storage system. Such a link could be a hardware, software, or hardware/software hybrid link. For another example, a link could also encompass wireless communication between a network master node and participating nodes in its configuration.

In block 1101 each participating node polls the master node at regular intervals on a continuous basis to compare the version number of its DDB with the master node's version number. In block 1102 a network link between the master node and a particular node fails. The particular node and the master node are otherwise fully operative. While the link has failed, the particular node still attempts to continuously poll its master to compare version numbers, but because of the failed link the master does not receive such polling and accordingly does not respond. In block 1103 after the failed link recovers, the next successive polling inquiry made by the particular node of the master after recovery is received by the master. In block 1104, responsive to receiving that next successive polling inquiry over the now-recovered network link, the master node sends its current DDB version number to the particular node over that link. In query block 1105 a version number comparison is made—the question is posed: does the particular node's DDB require updating? On the one hand, if the answer is "no", the algorithmic process stops. On the other hand, if the answer is "yes", then some event occurred during the time of the failed network link to cause the master to change the contents of its DDB and change its version number accordingly. The algorithmic process then moves to block 1106 wherein appropriate handshaking is undertaken as depicted in FIGS. 8 and 9 and that particular node's DDB is updated to match that of its master node, after which the algorithmic process concludes.

FIG. 12—Failed Master Node

FIG. 12 is a flowchart depicting an algorithm executed by operation of embodiments of the present invention in responding to a failed master node. Consider an operating network configuration, having a master node with its plurality of participating nodes, initially all nodes being operational. In block 1201 the master node fails for some reason. In block 1202, at some period of time after the master node's failure, the global administrator by way of the GUI attempts to change the configuration in some manner (e.g. adding or removing a node) but cannot do so. The global administrator instead receives an error response advising that no change to the configuration is possible since the master has failed. In block 1203, using the select master dialog in the GUI (FIG. 13), the global administrator appoints a different node in the configuration to be the new master for the configuration, which is permitted.

Until a change is attempted by the global administrator, participating nodes in the configuration continue to align themselves to the failed master, polling such failed master at regular intervals, but not receiving any version number check responses. The DDB information in each of those participating nodes is thus frozen until a new master is appointed. During the time of failure of the former master, which runs from the occurrence of the failure until discovery of the failure by the global administrator and appointment of a new master, other network configuration changes can also occur including, for example, one or more participating nodes can fail and/or one or more network links can fail.

The algorithmic process moves from block 1203 to block 1204. In block 1204 the new master sends out its "I am the master for you" message to each node whose IP address it has in its DDB which was obtained from the DDB of the failed former master node, including sending it to the failed former master node. As noted earlier in connection with a discussion about the pinging operation, the new master node then expects an acknowledgment from each of the nodes to which it sent this message, and if there are no acknowledgments from certain nodes (such as the failed former master node) then the new master node knows to repetitively ping these certain nodes at the predetermined pinging interval. Thus, in block 1205 the new master node sends out this same message over and over again as a repetitive ping at predetermined intervals to the former failed master node and to any other possibly failed nodes in its configuration which are now known to the new master because of no acknowledgments received back from those possibly failed nodes. In block 1206, when the failed former master node initially recovers it mistakenly believes itself to still be master for this configuration until it receives the next successive ping message directed to it by the new master advising it that: "I am the master for you". The now-recovered former master node then sends the appropriate acknowledgment to the new master whereby the new master stops pinging it. The now-recovered former master node next undergoes appropriate handshaking by way of FIGS. 8 and 9, during which the new master updates the DDB of the now-recovered former master node which is now demoted to just another participating and operative node of the configuration with its DDB contents matching that of the new master node. If there are other failed nodes, upon eventual recovery of each one of them it acknowledges the new master which stops the pinging by the master to it, and such recovered node goes through the handshaking process in FIGS. 8 and 9 to receive its appropriate DDB contents update.

If links failed during the time of failure of the failed former master node, the new master will attempt to repetitively ping the nodes connected to those failed links because such nodes cannot receive the initial "I am the master for you" message over failed links and therefore cannot acknowledge it, thus appearing to be failed nodes. Nor can such nodes communicate their polling inquiries to the new master over failed links. In block 1207, upon recovery of those failed links, nodes connected from those now-recovered links also are brought up-to-date, but in accordance with the algorithm depicted in FIG. 11 which brings into account the handshaking operations of FIGS. 8 and 9. Thereupon the algorithmic process of FIG. 12 is concluded.

FIG. 13—Select Master Dialog Box

FIG. 13 is a representation of a typical computer terminal screenshot associated with operation of certain embodiments of the present invention employing a graphical user interface (GUI) with a computer network including storage systems. A GUI could be employed within client or management workstation or user interface 100 in FIG. 1. The screenshot depicts a dialog box of the type which would enable a global administrator (privileged user) to control master node selection.

With regard to screen layout, in the upper left hand corner of the Figure, a "Select Master" title in the toolbar is shown and in the upper right hand corner in that toolbar an exit button "X" is shown and used to exit the dialog box. Under the heading "Master Node IP Address" there is shown an editable field containing, in this example, a specific IP address: 128.221.34.187. The global administrator can appoint or change master nodes by editing this field, described below. There is a "Master Candidate Nodes" section in the screenshot. This section displays nodes which are participating, configured nodes in the domain and are thus available as candidates from which one can be selected or elected by the global administrator as master. In this section, three categories of information are provided: "Node Information", "System Name" and "Provider Information".

Node Information includes IP address and system identifier of a particular node or system. As noted earlier, an entire storage system can be treated in object-oriented software as an object or node and thus can have an IP address (or possibly more than one address) associated with it. The system identifier is constructed from the last two segments of the IP address of that system (e.g. 128.221.34.187 is the IP address corresponding to system identifier CPC34187).

System Name is the name assigned to the system or node and is just a label or tag.

Provider Information includes name and version number of providers installed in the system. A provider is a functional software module. This version number is not the same as version number of the master node and its participating nodes earlier discussed, but is version number of the provider software.

There are three entries shown in the Master Candidate Nodes section, having system names "Array 3", "Array 2" and "Array 1", with associated Node Information and Provider Information. In the lower right corner of the Figure are four control buttons: "OK", "Apply", "Cancel", and "Help".

With regard to operation, the global administrator can point the cursor and mouse-click on Apply (can hit Apply button) to make a node selected from this group of three nodes appear in the editable field above and become new master for this configuration. In this example, the second candidate in the Master Candidate Nodes section corresponding to Array 2 is selected as master node, as is reflected in the editable field. The OK button performs the same action as the Apply button, but also closes the dialog box. The Cancel button closes the dialog box without saving the global administrator's changes thereby maintaining the status quo. And, the "Help" button launches a help menu for this Select Master dialog box.

However, before any of this operation can be performed, the global administrator first has to bring up the dialog box. And, before the dialog box can be brought up, the global administrator first has to bring up a web browser on his/her terminal screen and type into the Uniform Resource Locator (URL) slot the IP address of a storage system chosen by the global administrator (in this example, one of the IP addresses for Array 1, 2, or 3). Such storage system may be part of a small or large domain or network of storage systems and possibly other nodes. In this example the global administrator could have typed-in the IP address of any of the three arrays shown and the same substantive information would have been displayed because the DDB in each of the three storage systems contains the same directory data. However, the information may be displayed in a different order as a function of which IP address was typed in. By accessing a system or node in this manner, a framework software is brought into operation, which provides the framework or foundation of the terminal screen display. With reference to one of the incorporated-by-reference patent applications, "Plug and Play Interface for User Actions", Desai et al, U.S. Ser. No. 09/916,102, filed Jul. 26, 2001, a dialog box of this kind can be created by a software module that plugs into such framework software as described in that patent application. However, after framework software comes up, a security operation involving password access is next undertaken to ensure that only a user with proper password (presumably global administrator) has access to the Select Master dialog box. If the proper password is supplied, the framework software thereafter offers a menu item "Select Master". And, if that menu item is pointed-to and clicked-on by the global administrator, or other authorized user, then, this dialog box is finally launched.

The act of launching this dialog box causes reading of directory information from the DDB in the storage system node chosen by the global administrator. In this example, that DDB contains node, system name, and provider information of Array 3, Array 2 and Array 1 respectively, and displays it as shown. This information shows that this DDB has three storage arrays—three IP addresses in this case—and that the chosen storage system is thus participating in a domain or configuration that has three nodes. In the case where a storage array has two IP addresses associated with it, the same system name will appear on the screen twice, reflecting both IP addresses on two separate rows.

Any one of these three nodes (if all are operative) can be selected by the global administrator to be master node by merely highlighting that selection in the Master Node Candidates section and hitting the OK or Apply button. This action will move the IP address corresponding to that selection to the Master Node IP Address editable field and replace the IP address of any node that might have been in that field. That replaced master node is then demoted to being a participating node of the configuration. (Referring back to FIG. 4B, the "M" identifier is moved from Node 1 to either Nodes 2, 3, or 4 in that domain.) If one of the listed nodes had failed, for example Array 1, and is thereafter selected to be master node, then after highlighting Array 1 and hitting the Apply button the user interface returns an error signal indicating that CPC 3463 was not able to be contacted. Another node will then have to be selected. As noted, in this example, the global administrator selected array 2 and its IP address appears in the editable field at the upper portion of the screenshot. After the global administrator is finished with his/her master node selection, the dialog box can be closed out by hitting the X in the upper right corner.

FIG. 14—Configure Domain Dialog Box

FIG. 14 is a representation of a typical computer terminal screenshot associated with operation of the same embodiments of the present invention that produced the dialog of FIG. 13. FIG. 14 depicts a dialog box of the type which would enable a global administrator user to configure or reconfigure a domain. In the main toolbar section, "Configure Domain" is shown as the title of the dialog box. Also, in the main toolbar, right hand side, an exit button "X" is shown and is used to exit the dialog box by clicking on it.

With regard to screen layout, there are three sections displayed: "Domain Name" near the top, "Scan Subnets" below that, and "Select Systems" at the bottom half of the screenshot.

In Domain Name section its editable field shows name of domain of the system selected by the global administrator. The term "DefaultDomain" is shown in the field, and a default domain is automatically selected if not overridden by a different selection made by the global administrator. There is a "Change" button located to the right of this field.

In Scan Subnets section there are two fields, "Subnets To Add" which is an edit control and "Subnets To Scan" which is a list control. There are also four buttons shown: "A", "Scan", "Stop Scan" and "Clear". And there is a scan progress bar.

In Select Systems section there is an editable field entitled "IP Address of System" operated upon by a "B" button to its right; an "Available Systems" field operated upon by "C" and "D" buttons to its right, and a "Selected Systems" field operated upon by three "B", "C", and "D" buttons to its left. In addition, there is a "Clear" button at bottom of this section, as well as scroll bars shown at bottom of both Available Systems and Selected Systems fields.

At bottom of the screenshot are four buttons: "OK", "Apply" "Cancel" and "Help".

With regard to operation, this dialog is brought up in the same manner as described earlier in connection with the dialog of FIG. 13. In this case, there is a "Configure Domain" menu item presented which the Global Administrator clicks on and which launches this dialog box. When this dialog is launched, the name of the system or node pointed to by way of inserting its IP address into the URL slot appears in the Domain Name field in this dialog. If the global administrator wants to change this name he/she hits the Change button which brings up another dialog (not shown) with an editable field allowing the typing-in of a different name. The domain name is visible from all participating systems in that domain which means that this same name would appear in the Domain Name field regardless of which participating system's IP address was put into the URL slot by the global administrator. Two domains can be given the same name without malfunction, (they could all have the default domain name) but this could lead to confusion. In any event, any domain name must be in alphanumeric form only, and non-alphanumeric symbols are not permitted.

In the Subnets to Add edit control the global administrator types in the address of a subnet which he/she wishes to have scanned to discover any available systems (systems unaligned to any master node) that are also compatible with other nodes in the domain which the global administrator is in the process of configuring or re-configuring. For example, nodes or storage systems or servers which fall into the category of Common Information Model Object Manager (CIMOM) systems or servers are mutually compatible. Note that this address is not a full four-segment IP address, but is a subnet address or identifier (ID) having only three segments. The "A" button located to the right of the Subnets To Add edit control is used for moving contents of that edit control to the Subnets to Scan list control located to the right of the button, thereby populating that list control field which is initially empty when the dialog is brought up. A populated list control field thus reflects certain subnets which the global administrator wishes to scan. As can be seen, in this example subnet address "10.14.12" is the last subnet that was added to the Subnets to Scan field, as it is located at bottom of three subnet addresses shown in that field. The global administrator uses the screen cursor to highlight one or more subnets listed and hits the Scan button to the right of the list control to start a discovery operation on those highlighted subnets. The discovery operation will cause a display in the progress bar to show percentage of completion of scan operation. The Scan button is disabled from time that scanning is started until it is finished. The Clear button is used for clearing contents of list control, this button being enabled only if the global administrator selects (highlights) a subnet listed in the list control. The Clear button is disabled and a subnet cannot be highlighted in the list control field when scan operation is in progress. The Stop Scan button is used to stop scan operation which was started by hitting the Scan button, and will be enabled only if there is a scan in progress.

After a scanning operation has completed, where progress bar shows 100%, IP addresses of any discovered nodes that are unaligned to another master node and which are compatible with nodes in the domain under configuration are automatically sent to the Available Systems field in the Select Systems section of the dialog. In other words, these particular discovered nodes populate the Available Systems field which has sub headings of "System" (storage system name) and "Node Info" (storage system IP address). In the example shown, in the Subnets To Scan field, the subnet having address 128.221.34 contained an unaligned and compatible node with IP address 128.221.34.80 with system name Cadsys, and this is the first entry in the Available Systems window. Likewise, the subnet having address 128.221.42 contained three unaligned and compatible nodes: 128.221.42.64; 128.221.42.80; and, 128.221.42.122 which are three entries under Node Info in the Available Systems field. Finally, the last subnet scanned having address 10.14.12 contained an unaligned and compatible node with IP address of 10.14.12.105 which is the last entry shown in the Available Systems field.

The global administrator now has a choice of selecting any or all of these available systems for addition to the domain being configured. For example, to add the node named Cadsys the global administrator would highlight this entry in the Available Systems field and hit the C button. This action would move that Cadsys entry from the Available Systems field which would thus be decreased by one entry, to the Selected Systems field to the right of the button which would thus be increased by one entry. Then the global administrator hits the Apply or OK button to cause the master node to replicate the node added change in the DDBs of all nodes in the domain and thereby keep the DDBs consistent throughout the domain.

In the Selected Systems field there are shown three nodes having the same IP addresses that were shown in FIG. 13. These addresses appear in this field when this Configure Domain dialog is brought up, which means that the domain under configuration in FIG. 14 is the same domain for which the global administrator selected Array 2 having IP address 128.221.34.187 as master node in FIG. 13. In other words, in this illustrative example, the three nodes appearing in the Selected Systems field had been earlier selected for this domain and can thus be considered as "pre-selected" since they existed in the field prior to bringing up the dialog shown in FIG. 14. In accordance with our example, this entry of three nodes in the Selected Systems field can be increased by the addition of the Cadsys system and any others selected by the global administrator.

In the reverse operation, the population of the Selected Systems field can be reduced by the global administrator highlighting an entry in the Selected Systems field and hitting button "D" which moves that highlighted entry into the Available Systems field. Then the global administrator hits the Apply button which causes the DDB in the removed node to destruct (to discard its contents), thereby unaligning its DDB from alignment to master node cpc34187. This unalignment makes the removed node available for use by other global administrators. Hitting the Apply button also causes the master node to replicate this node removal change in all the remaining DDBs in the other nodes of this domain and thereby keep the DDBs consistent throughout the domain. The "Clear" button is used to clear or empty contents of the Available Systems field to make it open for repopulation by newly-discovered available systems derived from the scanning operation in the Scan Subnets section of the dialog. The cleared systems which are thus removed from view from the Available Systems field are otherwise unaffected and their DDBs remain intact. Scroll bars at bottom of both the Available Systems field and the Selected Systems field, also operable through left and right pointing arrow buttons at lower left and right corners of the fields, permit vertical scrolling of entries in both fields.

In the editable "IP Address of System" field located above the Available Systems field the IP address 128.221.34.16 is shown. This is an IP address of a node about which the global administrator has prior knowledge, and knows is both unaligned to any other master and compatible with nodes of this domain under configuration. The global administrator has thus typed-in this IP address into this editable field. By clicking on the "B" button, this IP address is moved into the selected Systems field and the OK or Apply button is then hit to add the node with this IP address to the configuration as described above. If the global administrator later wants to remove it, highlighting it and hitting the D button moves it over to the Available Systems field, in accordance with operation discussed above.

It should be understood that embodiments of the present invention relating to the GUI discussion of FIGS. 13 and 14 utilize JAVA® object oriented software, including the framework software discussed above and further discussed in the incorporated-by-reference patent application cited in discussion of FIG. 13A Software of the present invention operates on, through, and/or with a client workstation such as a Windows NT or UNIX® workstation to accomplish various GUI functions and operations, including those discussed in connection with both FIGS. 13 and 14.

FIGS. 4A and 8—Marriage of Two Subnets

With the GUI operational description of FIGS. 13 and 14 in mind, and referring back to FIG. 4A and FIG. 8, consider the marriage of two subnets. In FIG. 4A, where two domains or subnets are shown operating independently, each subnet is shown to have its own master. The DDB of each master node contains an IP address for each node in its own subnet. These two subnets can be physically linked or joined together (married) by the global administrator operating through the GUI, so that any node from either domain can communicate with any node from the other domain. In this married state, although communicatively linked, the nodes from each subnet behave in a manner consistent with their prior independent subnet status.

Using FIG. 4A as an example, in a subnet marriage, the two masters (nodes 1 and 6) remain within their respective domains, and the domain boundaries around domains 401 and 402 remain intact. However, there will be an operative coupling, a communication link or bus (not shown), that connects nodes 1–4 inclusive from domain 401 to nodes 5–8 inclusive from domain 402. For example, node 3 could talk to node 8, etc. Accordingly, if an IP address from one of the nodes from one of the subnets, for example node 2 from domain 1, is inserted into a web browser's URL slot on the GUI terminal screen, and a scan operation of this marriage of two subnets is performed, then nodes from both subnets will be discovered. (This instant scan is similar to, but different from, that shown in FIG. 13. The scan of FIG. 13 was for the purpose of discovering available nodes outside of a domain with which to configure or re-configure that domain, but this instant scan is to discover nodes currently existing within a domain and is performed through another dialog, not shown).

The result of this instant scan will cause node 2 to initiate an update to its master node 1, advising it of new nodes in the domain. Master node 1 will update its DDB with all node information from all nodes in both subnets. But, when master node 1 propagates its update to all nodes from both subnets, those nodes which comprise domain 402 reject the update. Those nodes have their own master node, master node 6. Because of the master to node handshake, nodes 5, 6, 7, and 8 will reject this update request since the IP address of master node 6 differs from the IP address of master node 1 (see FIG. 8, block 805). The global administrator will be able to see this at the GUI by looking at an eventlog. Master node 1 will mark nodes 5, 6, 7, and 8 in its DDB as remote nodes within its subnet. Likewise, master node 6 will mark in its DDB nodes 1, 2, 3, and 4 as remote nodes within its subnet. Thereafter, until further intervention by the global administrator, both sets of nodes co-exist in a marriage of subnets while retaining their individual autonomy.

This network configuration has practical utility when a link between domains is useful or economically feasible, but not on a continuous basis. For one example, consider the case where a startup company on a tight budget has two offices located on opposite coasts of the United States, and where they have need to access each others files. This business arrangement might arise when a West coast project is started at a different time from the East coast project and where it is useful to keep the two projects segregated except for intra-company access to each other's files. This company may lease network lines that are charged at an hourly rate to connect these two subnets cross country. And, with this marriage scheme, they can be disconnected each evening and reconnected each morning to effect a substantial savings in leased line costs. While these subnets are connected, co-workers at opposite ends of the country can read each others files at great convenience to the company, but they cannot otherwise impact each other's files, keeping the two projects segregated. The DDBs in the East coast's nodes are isolated from the West coast's master node and vice versa.

The present embodiments are to be considered in all respects as illustrative and not restrictive. The flowcharts used herein to demonstrate various aspects of the invention should not be construed to limit the present invention to any particular logic flow or logic implementation. For example, the alternative embodiment of the master to node handshake as depicted in FIG. 5A, shows that described logic may be combined or partitioned into different logic blocks, (e.g., programs, modules, functions, or subroutines) without changing the overall results or otherwise departing from the true scope of the invention. The present invention may thus be embodied in many different forms, including, but not limited to, computer program logic for use with any kind of processor, programmable logic for use with any kind of programmable logic device, discrete components, integrated circuitry including application specific integrated circuits (ASICs), or any other means including any combination thereof. Computer program logic implementing all or part of the functionality described herein may be embodied in various forms, including, but not limited to, source code form, computer executable form, and various intermediate forms (e.g. forms generated by an assembler, compiler, linker, or locator.) Source code may include a series of computer program instructions implemented in any of various programming languages for use with various operating systems or operating environments. The source code may define and use various data structures and communication messages. The source code may be in computer executable form, or it may be in a form convertible into computer executable form. The computer program may be fixed in any form either permanently or transitorily in a tangible storage medium, such as a semiconductor memory device, a magnetic memory device, an optical memory device, a PC card, or other memory device. The computer program many be fixed in any form in a signal that is transmittable to a computer using any of various communication technologies including, but not limited to, analog, digital, optical, wireless, networking, and internetworking technologies. The computer program may be distributed in any form as a removable storage medium with accompanying printed or electronic documentation, preloaded with a computer system (e.g. on system ROM or fixed disk), or distributed from a server or electronic bulletin board over the communication system (e.g., the Internet or World Wide Web).

The present invention may be used in any network environment where a distributed directory database is needed or utilized, such network being used for any purpose including, but not limited to, computer data storage. Furthermore, although embodiments of the present invention include C++ and JAVA object oriented software, other software could be utilized. Therefore, the scope of the invention is indicated by the appended claims rather than by the foregoing description, and all changes which come within the meaning and range of equivalency of the claims are intended to be embraced therein.

What is claimed is:

1. In a computer network having a plurality of nodes for interacting with computer network information including both computer data and domain configuration status, a system for managing said plurality of nodes comprising:
    means for establishing a DDB in each of said nodes;
    means for controlling contents of each said DDB to be identical to contents of every other said DDB and in a manner to avoid a single point of failure;
    wherein said contents controlling means further comprises:
        means for maintaining the most current of said domain configuration status in said DDB in said each of said nodes;
        means for selecting one of said plurality of nodes as a master node;
        means for subordinating all other of said plurality of nodes to said master node in a configuration defined by said master node and said all other of said plurality of nodes; and,
        wherein said master node includes means for responding to a change to said domain configuration status in a manner to maintain said contents of said each said DDB identical to said contents of said every other said DDB.

2. The system of claim 1 and wherein:
    said each of said nodes has a unique IP address; and,
    said DDB establishing means further comprises:
        means for associating each said unique IP address with its respective node to provide an IP-address-respective-node association;
        means for combining said association for said each of said nodes into a network IP association; and,
        means for distributing said network IP association to said DDB in said each of said nodes.

3. The system of claim 1 and wherein said interacting includes receiving, storing, modifying, and transmitting.

4. The system of claim 1 and wherein said controlling means further comprises:
    means for replacing said master node with another node if said master node fails.

5. The system of claim 4 and wherein said master node replacing means includes means for replacing said master node with another node selected from said configuration.

6. The system of claim 1 and wherein said change to said domain configuration status is selected from the group of changes consisting of: adding a first node to said configuration; deleting a second node from said configuration; a third node failing in said configuration; and, a network link failing between a fourth node in said configuration and said master node.

7. The system of claim 6 and wherein said computer network is a client-server network having a graphical user interface and wherein said selecting means further comprises:
    means, utilizing said graphical user interface, for invoking a select master dialog by which said user can select said one of said plurality of nodes.

8. The system of claim 4 and wherein said computer network is a client-server network having a graphical user interface and wherein said replacing means further comprises:
    means, utilizing said graphical user interface, for invoking a select master dialog by which said user can select said another node.

9. The system of claim 6 and wherein said responding means further comprises:
    first means for handling said third node failing under conditions in which said master node is known to said third node; and,
    second means for handling said third node failing under conditions in which said master node is unknown to said third node.

10. The system of claim 9 and wherein said first means further comprises:
    means for establishing version numbers to identify versions of said DDB in each of said plurality of nodes;
    means, employed by each of said all other of said plurality of nodes, for continuously polling said master node at regular intervals to obtain the most current one of said version numbers of the DDB in said master node;
    means employed by said master node, responsive to said polling received from said third node after recovery of said third node, for sending said most current one of said version numbers to said third node; and means for updating the DDB in said third node if said most current one of said version numbers does not match the version number of said DDB in said third node.

11. The system of claim 10 and wherein said third node DDB updating means includes means for handshaking between said master node and said third node.

12. The system of claim 9 and wherein said conditions in which said master node is unknown to said third node include both said third node failing while it is being added to said configuration and said master node was replaced during time of failure of said third node.

13. The system of claim 12 and wherein said second means further comprises:

means, employed by said master node, for repetitively pinging said third node at predetermined intervals until said third node recovers and sends a recovery signal to said master node; and, said master node including means, responsive to said recovery signal, for updating the DDB in said third node as may be needed.

14. The system of claim 13 and wherein said third node DDB updating means includes means for handshaking between said master node and said third node.

15. The system of claim 6 and wherein said responding means further comprises:

means for handling said network link failing.

16. The system of claim 15 and wherein said network link failing handling means further comprises:

means for establishing version numbers to identify versions of said DDB in each of said plurality of nodes;

means, employed by each of said all other of said plurality of nodes, for continuously polling said master node at regular intervals to obtain the most current one of said version numbers of the DDB in said master node;

means employed by said master node, responsive to said polling received from said fourth node after recovery of said network link, for sending said most current one of said version numbers to said fourth node; and, means for updating the DDB in said fourth node if said most current one of said version numbers does not match the version number of said DDB in said fourth node.

17. The system of claim 16 and wherein said fourth node DDB updating means includes means for handshaking between said master node and said fourth node.

18. The system of claim 6 and wherein said responding means further comprises:

means for handling said adding a first node to said configuration.

19. The system of claim 18 and wherein said first node adding handling means comprises:

means for determining if said first node is being added through said master node to obtain a master-added node or through one of said all other of said plurality of nodes to obtain a portal-added node.

20. The system of claim 19 and wherein said determining means, for the condition of said master-added node, further comprises:

said master node including means for updating the DDB in said master node with the IP address of said first node and for informing said first node that the first node's master is said master node;

said first node including means, responsive to operation of said informing means, for entering the IP address of said master node in the DDB of said first node and for acknowledging said master node; and, said master node including means for sending said IP address of said first node as an update to all other nodes in said configuration.

21. The system of claim 20 and wherein said IP address sending means further comprises:

means for performing a master to node handshake between said master node and said all other nodes in said configuration.

22. The system of claim 19 and wherein said determining means, for the condition of said portal-added node, further comprises:

a cache memory included in said portal node;

means for holding the IP address of said first node in said cache memory;

means for performing a node to master handshake between said first node and said master node;

said portal node including means for informing said master node of the IP address of said first node;

said master node including means for updating the DDB in said master node with the IP address of said first node and for informing said first node that the first node's master is said master node;

said first node including means, responsive to operation of said informing means, for entering the IP address of said master node in the DDB of said first node and for acknowledging said master node; and, said master node including means for sending said IP address of said first node as an update to all other nodes in said configuration.

23. The system of claim 22 and wherein said IP address sending means further comprises:

means for performing a master to node handshake between said master node and said all other nodes in said configuration.

24. The system of claim 7 and wherein said responding means further comprises:

means for handling said deleting a second node from said plurality of nodes.

25. The system of claim 24 and wherein said second node deleting handling means further comprises:

means, utilizing said graphical user interface, for removing said second node from said configuration;

means for determining if said second node is removed through said master node;

means, responsive to operation of said determining means removing said second node through said master node, for:

(1) updating the DDB in said master node by removing the IP address of said second node from the DDB of said master node;

(2) informing said second node that said configuration no longer includes said second node and detaching said second node from said configuration;

(3) erasing all contents of the DDB of said second node; and, (4) sending an update to all remaining nodes in said configuration.

26. The system of claim 25 and wherein said update sending means further comprises:

means for performing a master to node handshake between said master node and said all remaining nodes in said configuration.

27. The system of claim 24 and wherein said second node deleting handling means further comprises:

means, utilizing said graphical user interface, for removing said second node from said configuration;
means for selecting a portal-removal node other than said master node through which to remove said second node from said configuration;
a cache memory included in said portal-removal node;
means for determining if said second node is removed through said master node;
means, responsive to operation of said determining means removing said second node through said portal-removal node and not through said master node, for:
  (1) storing the IP address of said second node in said cache;
  (2) performing a node to master handshake between said portal-removal node and said master node;
  (3) informing said master node to remove the IP address of said second node from the DDB of said master node;
  (4) updating the DDB in said master node by removing the IP address of said second node from the DDB of said master node;
  (5) informing said second node that said configuration no longer includes said second node and detaching said second node from said configuration;
  (6) erasing all contents of the DDB of said second node; and,
  (7) sending an update to all remaining nodes in said configuration.

28. The system of claim 27 and wherein said update sending means further comprises:
  means for performing a master to node handshake between said master node and said all remaining nodes in said configuration.

29. The system of claim 21 or 23 and wherein said master to node handshake performing means comprises for each one of said all other nodes in said configuration:
  first deciding means for deciding if the IP address of said master node in said update matches the IP address of said master node contained in the DDB of said each one of said all other nodes in said configuration;
  means, responsive to operation of said first deciding means deciding no match, for rejecting said update and logging said event;
  second deciding means, responsive to operation of said first deciding means deciding a match, for deciding if the version number of the DDB in said master node before said update matches the version number of said DDB of said each one of said all other nodes in said configuration before said update;
  means, responsive to operation of said second deciding means deciding no match, for accepting a completely updated DDB with updated version number from said master node; and,
  means, responsive to operation of said second deciding means deciding a match, for accepting only said update with said updated version number from said master node.

30. The system of claim 26 or 28 and wherein said master to node handshake performing means comprises for each one of said all remaining nodes in said configuration:
  first deciding means for deciding if the IP address of said master node in said update matches the IP address of said master node contained in the DDB of said each one of said all remaining nodes in said configuration;
  means, responsive to operation of said first deciding means deciding no match, for rejecting said update and logging said event;
  second deciding means, responsive to operation of said first deciding means deciding a match, for deciding if the version number of the DDB in said master node before said update matches the version number of said DDB of said each one of said all remaining nodes in said configuration;
  means, responsive to operation of said second deciding means deciding no match, for accepting a completely updated DDB with updated version number from said master node; and,
  means, responsive to operation of said second deciding means deciding a match, for accepting only said update with said updated version number from said master node.

31. A computer program product for use in a computer network having a plurality of nodes for interacting with computer network information including both computer data and domain configuration status, said computer program product including a computer usable medium having computer readable program code thereon for managing said plurality of nodes, said program code comprising:
  program code for establishing a DDB in each of said nodes;
  program code for controlling contents of each said DDB to be identical to contents of every other said DDB and in manner to avoid a single point of failure;
  wherein said contents controlling program code further comprises:
    program code for maintaining the most current of said domain configuration status in said DDB in said each of said nodes;
    program code for selecting one of said plurality of nodes as a master node;
    program code for subordinating all other of said plurality of nodes to said master node in a configuration defined by said master node and said all other of said plurality of nodes; and,
    wherein said master node includes program code for responding to a change to said domain configuration status in a manner to maintain said contents of said each said DDB identical to said contents of said every other said DDB.

32. The computer program product of claim 31 and wherein:
  said each of said nodes has a unique IP address; and,
  said DDB establishing program code further comprises:
    program code for associating each said unique IP address with its respective node to provide an IP-address-respective-node association;
    program code for combining said association for said each of said nodes into a network IP association; and,
    program code for distributing said network IP association to said DDB in said each of said nodes.

33. The computer program product of claim 31 and wherein said interacting includes receiving, storing, modifying, and transmitting.

34. The computer program product of claim 31 and wherein said controlling program code further comprises:
  program code for replacing said master node with another node if said master node fails.

35. The computer program product of claim 34 and wherein said master node replacing program code includes program code for replacing said master node with another node selected from said configuration.

36. The computer program product of claim 31 and wherein said change to said domain configuration status is selected from the group of changes consisting of: adding a first node to said configuration; deleting a second node from said configuration; a third node failing in said configuration; and, a network link failing between a fourth node in said configuration and said master node.

37. The computer program product of claim 36 and wherein said computer network is a client-server network having a graphical user interface and wherein said selecting program code further comprises:
   program code, utilizing said graphical user interface, for invoking a select master dialog by which said user can select said one of said plurality of nodes.

38. The computer program product of claim 34 and wherein said computer network is a client-server network having a graphical user interface and wherein said replacing program code further comprises:
   program code, utilizing said graphical user interface, for invoking a select master dialog by which said user can select said another node.

39. The computer program product of claim 36 and wherein said responding program code further comprises:
   first program code for handling said third node failing under conditions in which said master node is known to said third node; and,
   second program code for handling said third node failing under conditions in which said master node is unknown to said third node.

40. The computer program product of claim 39 and wherein said first program code further comprises:
   program code for establishing version numbers to identify versions of said DDB in each of said plurality of nodes;
   program code, employed by each of said all other of said plurality of nodes, for continuously polling said master node at regular intervals to obtain the most current one of said version numbers of the DDB in said master node;
   program code employed by said master node, responsive to said polling received from said third node after recovery of said third node, for sending said most current one of said version numbers to said third node; and
   program code for updating the DDB in said third node if said most current one of said version numbers does not match the version number of said DDB in said third node.

41. The computer program product of claim 40 and wherein said third node DDB updating program code includes program code for handshaking between said master node and said third node.

42. The computer program product of claim 39 and wherein said conditions in which said master node is unknown to said third node include both said third node failing while it is being added to said configuration and said master node was replaced during time of failure of said third node.

43. The computer program product of claim 42 and wherein said second program code further comprises:
   program code, employed by said master node, for repetitively pinging said third node at predetermined intervals until said third node recovers and sends a recovery signal to said master node; and,
   said master node including program code, responsive to said recovery signal, for updating the DDB in said third node as may be needed.

44. The computer program product of claim 43 and wherein said third node DDB updating program code includes program code for handshaking between said master node and said third node.

45. The computer program product of claim 36 and wherein said responding program code further comprises:
   program code for handling said network link failing.

46. The computer program product of claim 45 and wherein said network link failing handling program code further comprises:
   program code for establishing version numbers to identify versions of said DDB in each of said plurality of nodes;
   program code, employed by each of said all other of said plurality of nodes, for continuously polling said master node at regular intervals to obtain the most current one of said version numbers of the DDB in said master node;
   program code employed by said master node, responsive to said polling received from said fourth node after recovery of said network link, for sending said most current one of said version numbers to said fourth node; and,
   program code for updating the DDB in said fourth node if said most current one of said version numbers does not match the version number of said DDB in said fourth node.

47. The computer program product of claim 46 and wherein said fourth node DDB updating program code includes program code for handshaking between said master node and said fourth node.

48. The computer program product of claim 36 and wherein said responding program code further comprises:
   program code for handling said adding a first node to said configuration.

49. The computer program product of claim 48 and wherein said first node adding handling program code comprises:
   program code for determining if said first node is being added through said master node to obtain a master-added node or through one of said all other of said plurality of nodes to obtain a portal-added node.

50. The computer program product of claim 49 and wherein said determining program code, for the condition of said master-added node, further comprises:
   said master node including program code for updating the DDB in said master node with the IP address of said first node and for informing said first node that the first node's master is said master node;
   said first node including program code, responsive to operation of said informing program code, for entering the IP address of said master node in the DDB of said first node and for acknowledging said master node; and,
   said master node including program code for sending said IP address of said first node as an update to all other nodes in said configuration.

51. The computer program product of claim 50 and wherein said IP address sending program code further comprises:
   program code for performing a master to node handshake between said master node and said all other nodes in said configuration.

52. The computer program product of claim 49 and wherein said determining program code, for the condition of said portal-added node, further comprises:
   a cache memory included in said portal node;
   program code for holding the IP address of said first node in said cache memory;
   program code for performing a node to master handshake between said first node and said master node;

said portal node including program code for informing said master node of the IP address of said first node;

said master node including program code for updating the DDB in said master node with the IP address of said first node and for informing said first node that the first node's master is said master node;

said first node including program code, responsive to operation of said informing program code, for entering the IP address of said master node in the DDB of said first node and for acknowledging said master node; and, said master node including program code for sending said IP address of said first node as an update to all other nodes in said configuration.

53. The computer program product of claim 52 and wherein said IP address sending program code further comprises:

program code for performing a master to node handshake between said master node and said all other nodes in said configuration.

54. The computer program product of claim 37 and wherein said responding program code further comprises:

program code for handling said deleting a second node from said plurality of nodes.

55. The computer program product of claim 54 and wherein said second node deleting handling program code further comprises:

program code, utilizing said graphical user interface, for removing said second node from said configuration;

program code for determining if said second node is removed through said master node;

program code, responsive to operation of said determining program code removing said second node through said master node, for:
   (1) updating the DDB in said master node by removing the IP address of said second node from the DDB of said master node;
   (2) informing said second node that said configuration no longer includes said second node and detaching said second node from said configuration;
   (3) erasing all contents of the DDB of said second node; and,
   (4) sending an update to all remaining nodes in said configuration.

56. The computer program product of claim 55 and wherein said update sending program code further comprises:

program code for performing a master to node handshake between said master node and said all remaining nodes in said configuration.

57. The computer program product of claim 54 and wherein said second node deleting handling program code further comprises:

program code, utilizing said graphical user interface, for removing said second node from said configuration;

program code for selecting a portal-removal node other than said master node through which to remove said second node from said configuration;

a cache memory included in said portal-removal node;

program code for determining if said second node is removed through said master node;

program code, responsive to operation of said determining program code removing said second node through said portal-removal node and not through said master node, for:
   (1) storing the IP address of said second node in said cache;
   (2) performing a node to master handshake between said portal-removal node and said master node;
   (3) informing said master node to remove the IP address of said second node from the DDB of said master node;
   (4) updating the DDB in said master node by removing the IP address of said second node from the DDB of said master node;
   (5) informing said second node that said configuration no longer includes said second node and detaching said second node from said configuration;
   (6) erasing all contents of the DDB of said second node; and,
   (7) sending an update to all remaining nodes in said configuration.

58. The computer program product of claim 57 and wherein said update sending program code further comprises:

program code for performing a master to node handshake between said master node and said all remaining nodes in said configuration.

59. The computer program product of claim 51 or 53 and wherein said master to node handshake performing program code comprises for each one of said all other nodes in said configuration:

first deciding program code for deciding if the IP address of said master node in said update matches the IP address of said master node contained in the DDB of said each one of said all other nodes in said configuration;

program code, responsive to operation of said first deciding program code deciding no match, for rejecting said update and logging said event;

second deciding program code, responsive to operation of said first deciding program code deciding a match, for deciding if the version number of the DDB in said master node before said update matches the version number of said DDB of said each one of said all other nodes in said configuration before said update;

program code, responsive to operation of said second deciding program code deciding no match, for accepting a completely updated DDB with updated version number from said master node; and, program code, responsive to operation of said second deciding program code deciding a match, for accepting only said update with said updated version number from said master node.

60. The computer program product of claim 56 or 58 and wherein said master to node handshake performing program code comprises for each one of said all remaining nodes in said configuration:

first deciding program code for deciding if the IP address of said master node in said update matches the IP address of said master node contained in the DDB of said each one of said all remaining nodes in said configuration;

program code, responsive to operation of said first deciding program code deciding no match, for rejecting said update and logging said event;

second deciding program code, responsive to operation of said first deciding program code deciding a match, for deciding if the version number of the DDB in said master node before said update matches the version number of said DDB of said each one of said all remaining nodes in said configuration;

program code, responsive to operation of said second deciding program code deciding no match, for accepting a completely updated DDB with updated version number from said master node; and, program code, responsive to operation of said second deciding program code deciding a match, for accepting only said update with said updated version number from said master node.

61. In a computer network having a plurality of nodes for interacting with computer network information including both computer data and domain configuration status, a method for managing said plurality of nodes comprising:
establishing a DDB in each of said nodes;
controlling contents of each said DDB to be identical to contents of every other said DDB and in a manner to avoid a single point of failure;
wherein said contents controlling further comprises:
maintaining the most current of said domain configuration status in said DDB in said each of said nodes;
selecting one of said plurality of nodes as a master node;
subordinating all other of said plurality of nodes to said master node in a configuration defined by said master node and said all other of said plurality of nodes; and,
said master node responding to a change to said domain configuration status in a manner to maintain said contents of said each said DDB identical to said contents of said every other said DDB.

62. The method of claim 61 and wherein:
said each of said nodes has a unique IP address; and,
said DDB establishing further comprises:
associating each said unique IP address with its respective node to provide an IP-address-respective-node association;
combining said association for said each of said nodes into a network IP association; and,
distributing said network IP association to said DDB in said each of said nodes.

63. The method of claim 62 and wherein said interacting includes receiving, storing, modifying, and transmitting.

64. The method of claim 62 and wherein said controlling further comprises:
replacing said master node with another node if said master node fails.

65. The method of claim 64 and wherein said master node replacing includes replacing said master node with another node selected from said configuration.

66. The method of claim 62 and wherein said change to said domain configuration status is selected from the group of changes consisting of: adding a first node to said configuration; deleting a second node from said configuration; a third node failing in said configuration; and, a network link failing between a fourth node in said configuration and said master node.

67. The method of claim 66 and wherein said computer network is a client-server network having a graphical user interface and wherein said selecting further comprises:
utilizing said graphical user interface to invoke a select master dialog by which said user can select said one of said plurality of nodes.

68. The method of claim 64 and wherein said computer network is a client-server network having a graphical user interface and wherein said replacing further comprises:
utilizing said graphical user interface to invoke a select master dialog by which said user can select said another node.

69. The method of claim 66 and wherein said responding further comprises:

first handling said third node failing under conditions in which said master node is known to said third node; and,
second handling said third node failing under conditions in which said master node is unknown to said third node.

70. The method of claim 69 and wherein said first handling further comprises:
establishing version numbers to identify versions of said DDB in each of said plurality of nodes;
each of said all other of said plurality of nodes continuously polling said master node at regular intervals to obtain the most current one of said version numbers of the DDB in said master node;
said master node, responsive to said polling received from said third node after recovery of said third node, sending said most current one of said version numbers to said third node; and
updating the DDB in said third node if said most current one of said version numbers does not match the version number of said DDB in said third node.

71. The method of claim 70 and wherein said third node DDB updating includes handshaking between said master node and said third node.

72. The method of claim 69 and wherein said conditions under which said master node is unknown to said third node include both said third node failing while being added to said configuration and said master node being replaced during time of failure of said third node.

73. The method of claim 72 and wherein said second handling further comprises:
said master node repetitively pinging said third node at predetermined intervals until said third node recovers and sends a recovery signal to said master node; and,
said master node, responsive to said recovery signal, updating the DDB in said third node as may be needed.

74. The method of claim 73 and wherein said third node DDB updating includes handshaking between said master node and said third node.

75. The method of claim 66 and wherein said responding further comprises:
handling said network link failing.

76. The method of claim 75 and wherein said network link failing handling further comprises:
establishing version numbers to identify versions of said DDB in each of said plurality of nodes;
each of said all other of said plurality of nodes continuously polling said master node at regular intervals to obtain the most current one of said version numbers of the DDB in said master node;
said master node, responsive to said polling received from said fourth node after recovery of said network link, sending said most current one of said version numbers to said fourth node; and,
updating the DDB in said fourth node if said most current one of said version numbers does not match the version number of said DDB in said fourth node.

77. The method of claim 76 and wherein said fourth node DDB updating includes handshaking between said master node and said fourth node.

78. The method of claim 66 and wherein said responding further comprises:
handling said adding a first node to said configuration.

79. The method of claim 78 and wherein said first node adding handling comprises:

determining if said first node is being added through said master node to obtain a master-added node or through one of said all other of said plurality of nodes to obtain a portal-added node.

80. The method of claim 79 and wherein said determining, for the condition of said master-added node, further comprises:
said master node updating the DDB in said master node with the IP address of said first node and informing said first node that the first node's master is said master node;
said first node, responsive to said informing, entering the IP address of said master node in the DDB of said first node and acknowledging said master node; and,
said master node sending said IP address of said first node as an update to all other nodes in said configuration.

81. The method of claim 80 and wherein said IP address sending further comprises:
performing a master to node handshake between said master node and said all other nodes in said configuration.

82. The method of claim 79 for the condition of said portal-added node, and wherein said portal-added node includes a cache memory, said determining further comprising:
holding the IP address of said first node in said cache memory;
performing a node to master handshake between said first node and said master node;
said portal node informing said master node of the IP address of said first node;
said master node updating the DDB in said master node with the IP address of said first node and informing said first node that the first node's master is said master node;
said first node, responsive to said informing, entering the IP address of said master node in the DDB of said first node and acknowledging said master node; and,
said master node sending said IP address of said first node as an update to all other nodes in said configuration.

83. The method of claim 82 and wherein said IP address sending further comprises:
performing a master to node handshake between said master node and said all other nodes in said configuration.

84. The method of claim 67 and wherein said responding further comprises:
handling said deleting a second node from said plurality of nodes.

85. The method of claim 84 and wherein said second node deleting handling further comprises:
utilizing said graphical user interface to remove said second node from said configuration;
determining if said second node is removed through said master node;
said determining, responsive to said utilizing removing said second node through said master node, for:
(1) updating the DDB in said master node by removing the IP address of said second node from the DDB of said master node;
(2) informing said second node that said configuration no longer includes said second node and detaching said second node from said configuration;
(3) erasing all contents of the DDB of said second node; and,
(4) sending an update to all remaining nodes in said configuration.

86. The method of claim 85 and wherein said update sending further comprises:
performing a master to node handshake between said master node and said all remaining nodes in said configuration.

87. The method of claim 84 and wherein said second node deleting handling further comprises:
utilizing said graphical user interface to remove said second node from said configuration;
selecting a portal-removal node other than said master node through which to remove said second node from said configuration;
establishing a cache memory in said portal-removal node;
determining if said second node is removed through said master node;
said determining, responsive to said utilizing removing said second node through said portal-removal node and not through said master node:
(1) storing the IP address of said second node in said cache;
(2) performing a node to master handshake between said portal-removal node and said master node;
(3) informing said master node to remove the IP address of said second node from the DDB of said master node;
(4) updating the DDB in said master node by removing the IP address of said second node from the DDB of said master node;
(5) informing said second node that said configuration no longer includes said second node and detaching said second node from said configuration;
(6) erasing all contents of the DDB of said second node; and,
(7) sending an update to all remaining nodes in said configuration.

88. The method of claim 87 and wherein said update sending further comprises:
performing a master to node handshake between said master node and said all remaining nodes in said configuration.

89. The method of claim 81, 83, 86, or 88 and wherein said master to node handshake performing comprises for each one of said all other nodes in said configuration:
deciding if the IP address of said master node in said update matches the IP address of said master node contained in the DDB of said each one of said all other nodes in said configuration;
if no IP address match, rejecting said update and logging said event;
if an IP address match, deciding if the version number of the DDB in said master node before said update matches the version number in the DDB of said each one of said all other nodes in said configuration before said update;
if no version number match, accepting a completely updated DDB with updated version number from said master node; and,
if a version number match, accepting only said update with said updated version number from said master node.

* * * * *